(12) United States Patent
Livanos et al.

(10) Patent No.: US 10,791,431 B2
(45) Date of Patent: Sep. 29, 2020

(54) METHODS AND APPARATUS FOR ESTABLISHING A GROUP SESSION IN A MOBILE NETWORK FOR SUBSCRIBERS ASSOCIATED WITH A GROUP

(71) Applicant: Cisco Technology, Inc., San Jose, CA (US)

(72) Inventors: Konstantin Livanos, Naperville, IL (US); Ian McDowell Campbell, Littleton, CO (US); Malgorzata Kaczmarska-Wojtania, Plano, TX (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 186 days.

(21) Appl. No.: 15/823,361

(22) Filed: Nov. 27, 2017

(65) Prior Publication Data

US 2019/0166467 A1    May 30, 2019

(51) Int. Cl.
*H04W 4/08* (2009.01)
*H04W 76/12* (2018.01)
(Continued)

(52) U.S. Cl.
CPC .............. *H04W 4/08* (2013.01); *H04W 8/04* (2013.01); *H04W 8/186* (2013.01); *H04W 48/00* (2013.01);
(Continued)

(58) Field of Classification Search
CPC ....... H04W 4/08; H04W 76/10; H04W 76/11; H04W 76/12; H04W 76/01; H04W 76/40;
(Continued)

(56) References Cited

U.S. PATENT DOCUMENTS 8,655,996 B2   2/2014  Sheth et al.
8,891,423 B2  11/2014  Shaheen et al.
(Continued)

FOREIGN PATENT DOCUMENTS

CN    102014343 A   *  4/2011  ............ H04L 12/14
CN    106900081 A      6/2017
(Continued)

OTHER PUBLICATIONS

English translation of CN 102014343 A (Year: 2011).*
(Continued)

*Primary Examiner* — Ian N Moore
*Assistant Examiner* — Brian T Le

(57) ABSTRACT

Methods and apparatus for use in establishing a group session in a mobile network for subscribers associated with a group are described. In one illustrative example, an access and mobility management function (AMF) entity receives, from a user equipment (UE), a request for registration which includes network slice selection assistance information (NS-SAI). The NSSAI includes a group identifier associated with a group of subscribers. The AMF entity sends, to a unified data management (UDM) entity, a request for subscriber data which includes the group identifier. The AMF entity receives, from the UDM, a response to the request for subscriber data which includes a plurality of subscriber identifiers corresponding to the subscribers of the group. For a group session, the AMF entity creates a context associated with the group identifier and stores the context locally.

19 Claims, 24 Drawing Sheets

(51) Int. Cl.
    *H04W 48/00*    (2009.01)
    *H04W 76/40*    (2018.01)
    *H04W 8/04*     (2009.01)
    *H04W 8/18*     (2009.01)
    *H04W 60/04*    (2009.01)
    *H04W 4/70*     (2018.01)

(52) U.S. Cl.
    CPC ........... *H04W 76/12* (2018.02); *H04W 76/40* (2018.02); *H04W 4/70* (2018.02); *H04W 60/04* (2013.01)

(58) Field of Classification Search
    CPC ......... H04W 8/04; H04W 8/06; H04W 8/186; H04W 8/18; H04W 8/183; H04W 48/00; H04W 4/70; H04W 60/04; H04W 60/00; H04W 60/005; H04W 60/02
    See application file for complete search history.

(56) References Cited

U.S. PATENT DOCUMENTS

| | | | |
|---|---|---|---|
| 9,325,582 | B2 | 4/2016 | Agrawal et al. |
| 2011/0167471 | A1 | 7/2011 | Riley et al. |
| 2015/0103647 | A1 | 4/2015 | Batz et al. |
| 2015/0341851 | A1 | 11/2015 | Cai et al. |
| 2016/0135143 | A1 | 5/2016 | Won et al. |
| 2016/0301779 | A1 | 10/2016 | Cui et al. |
| 2016/0353465 | A1 | 12/2016 | Vrzic et al. |
| 2017/0054595 | A1 | 2/2017 | Zhang et al. |
| 2017/0070892 | A1 | 3/2017 | Song et al. |
| 2017/0093749 | A1 | 3/2017 | Hoffmann |

FOREIGN PATENT DOCUMENTS

| | | | |
|---|---|---|---|
| WO | 2011/026440 | A1 | 3/2011 |
| WO | 2011026440 | A1 | 3/2011 |
| WO | 2014013057 | A1 | 1/2014 |
| WO | 2016/096013 | A1 | 6/2016 |
| WO | 2016096013 | A1 | 6/2016 |
| WO | 2016190641 | A1 | 12/2016 |
| WO | 2017012674 | A1 | 1/2017 |
| WO | 2017063708 | A1 | 4/2017 |
| WO | 2017074486 | A1 | 5/2017 |
| WO | 2017080518 | A1 | 5/2017 |
| WO | 2017113100 | A1 | 7/2017 |
| WO | 2018194971 | A1 | 10/2018 |

OTHER PUBLICATIONS

Kim et al., "3GPP SA2 Architecture and Functions for 5G Mobile Communicatio System", The Korean Institute of Communications and Information Sciences, Electronics and Telecommunications Research Institute (ETRI), Daejeon, Republic of Korea, Jan. 16, 2017, pp. 1-8.

"3rd Generation Partnership Project; Technical Specification Group Services and System Aspects; System Architecture for the 5G System; Stage 2", 3GPP TS 23.501 V1.20. (Jul. 2017), pp. 1-166.

"3rd Generation Partnership Project; Technical Specification Group Services and System Aspects; Architecture Enhancements to Facilitate Communications with Packet Data Networks and Applications (Release 13)", 3GPP TS 23.682 V13.5.0 (Mar. 2016), pp. 1-90.

"Solutions on Message Delivery to a Group of Devices", Hisilicon Huawei, SA WG2 Meeting #105, Oct. 13-17, 2014, Sapporo, Japan, pp. 1-4.

Jiang et al., "Network Slicing Management & Prioritization in 5G Mobile Systems", King's College London, London, UK, pp. 1-6.

Yoo et al., "Network Slicing Architecture for 5G Network", Hyper-Connected Communication Research Lab, Conference Paper for Korea University of Science and Technology, Jan. 24, 2017, pp. 1-6.

International Search Report and Written Opinion in counterpart International Application No. PCT/US2018/067831, dated Aug. 7, 2019, 25 pages.

3GPP, "3rd Generation Partnership Project; Technical Specification Group Services and System Aspects; Procedures for the 5G System; Stage 2 (Release 15)", 3GPP TS 23.502 V1.3.0, Nov. 2017, 215 pages.

Sofia, Bulgaria, "Solution for Frequent Small Data with S1/S5/S8 Bearer Aggregation", SA WG2 Meeting #93, S2-123887, Oct. 12, 2012, 2 pages.

3GPP Organizational Partners, "3rd Generation Partnership Project; Technical Specification Group Services and System Aspects; Procedures for the 5G System; Stage 2 (Release 15)", 3GPP TS 23.502 V1.2.0, Sep. 2017, 165 pages.

Invitation to Pay Additional Fees and Partial International Search Report in corresponding International Application No. PCT/US2018/067831, dated Apr. 8, 2019, 14 pages.

Technical Specification, "3rd Generation Partnership Project; Technical Specification Group Services and System Aspects; Procedures for the 5G System; Stage 2 (Release 15)", 3GPP TS 23.502 V1.3.0, Nov. 2017, 215 pages.

* cited by examiner

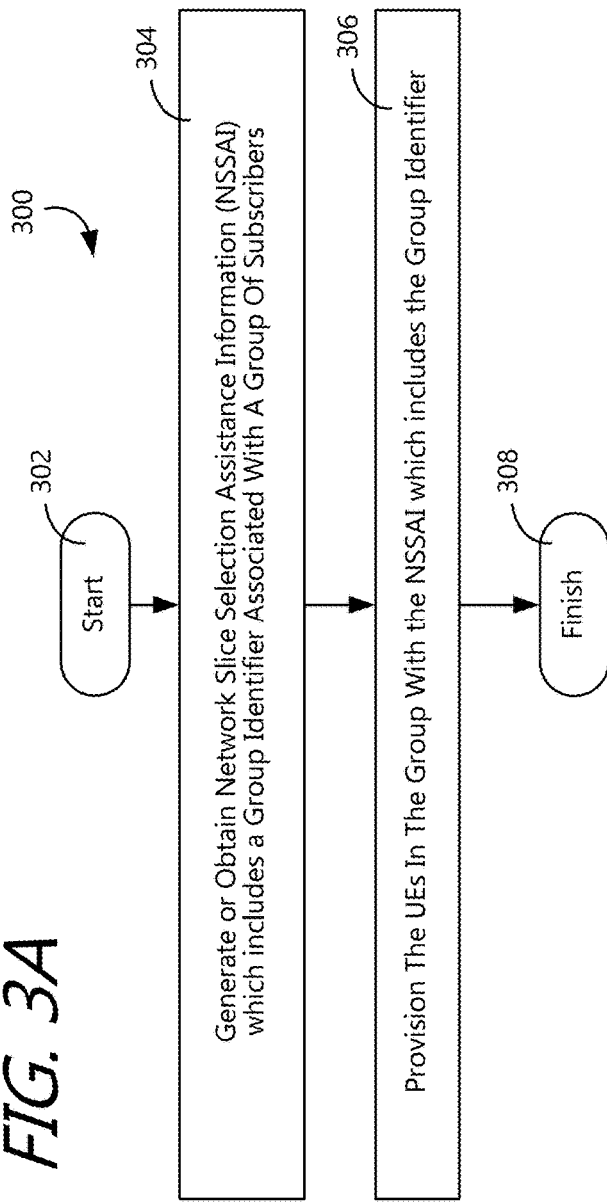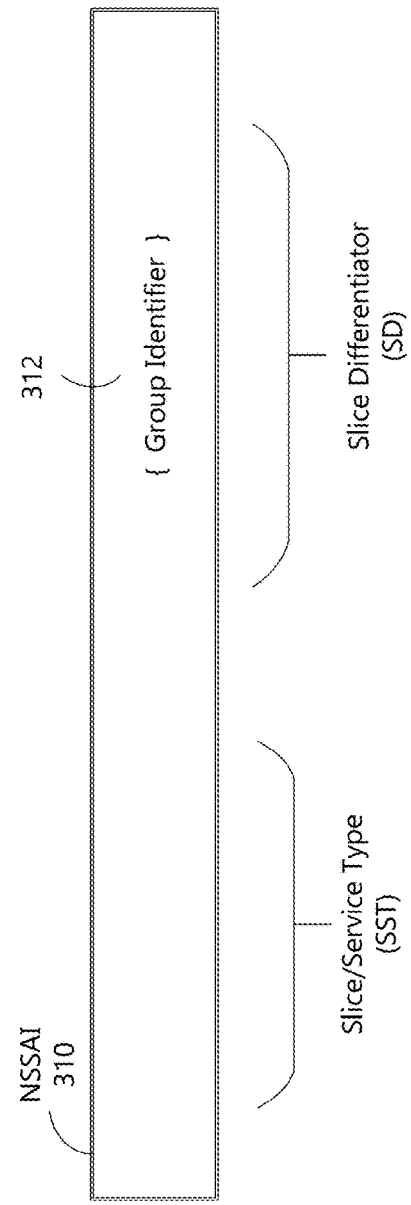

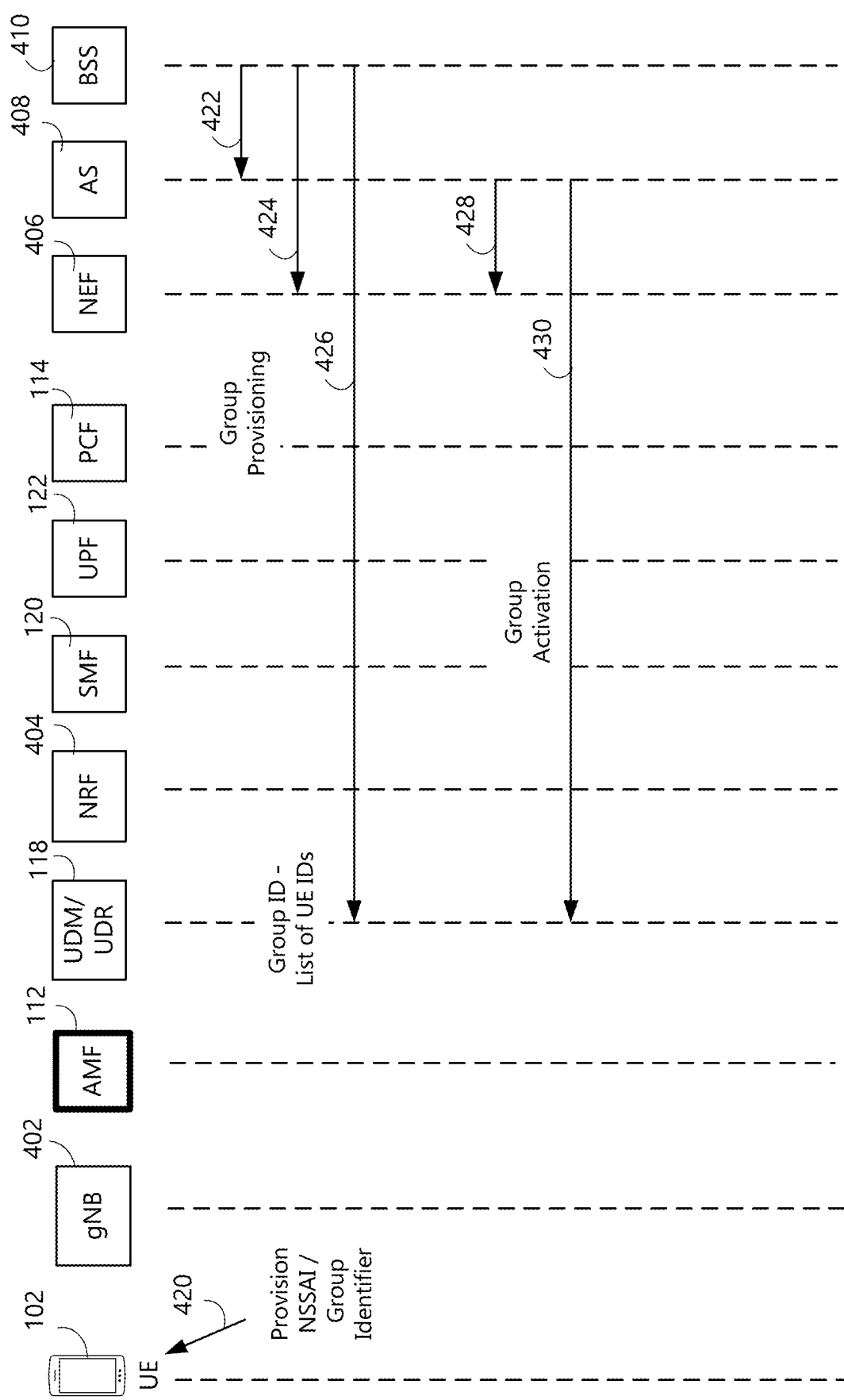

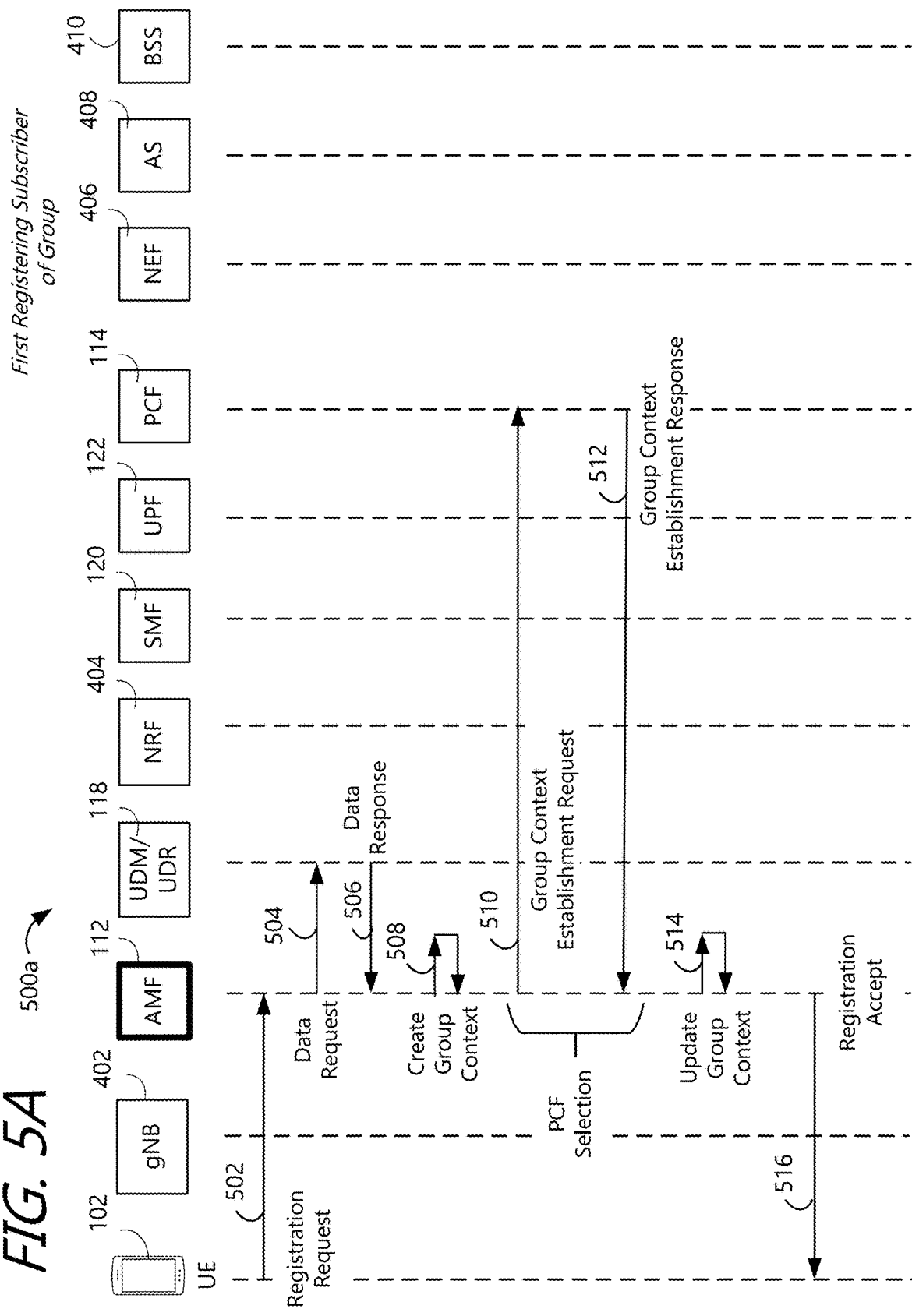

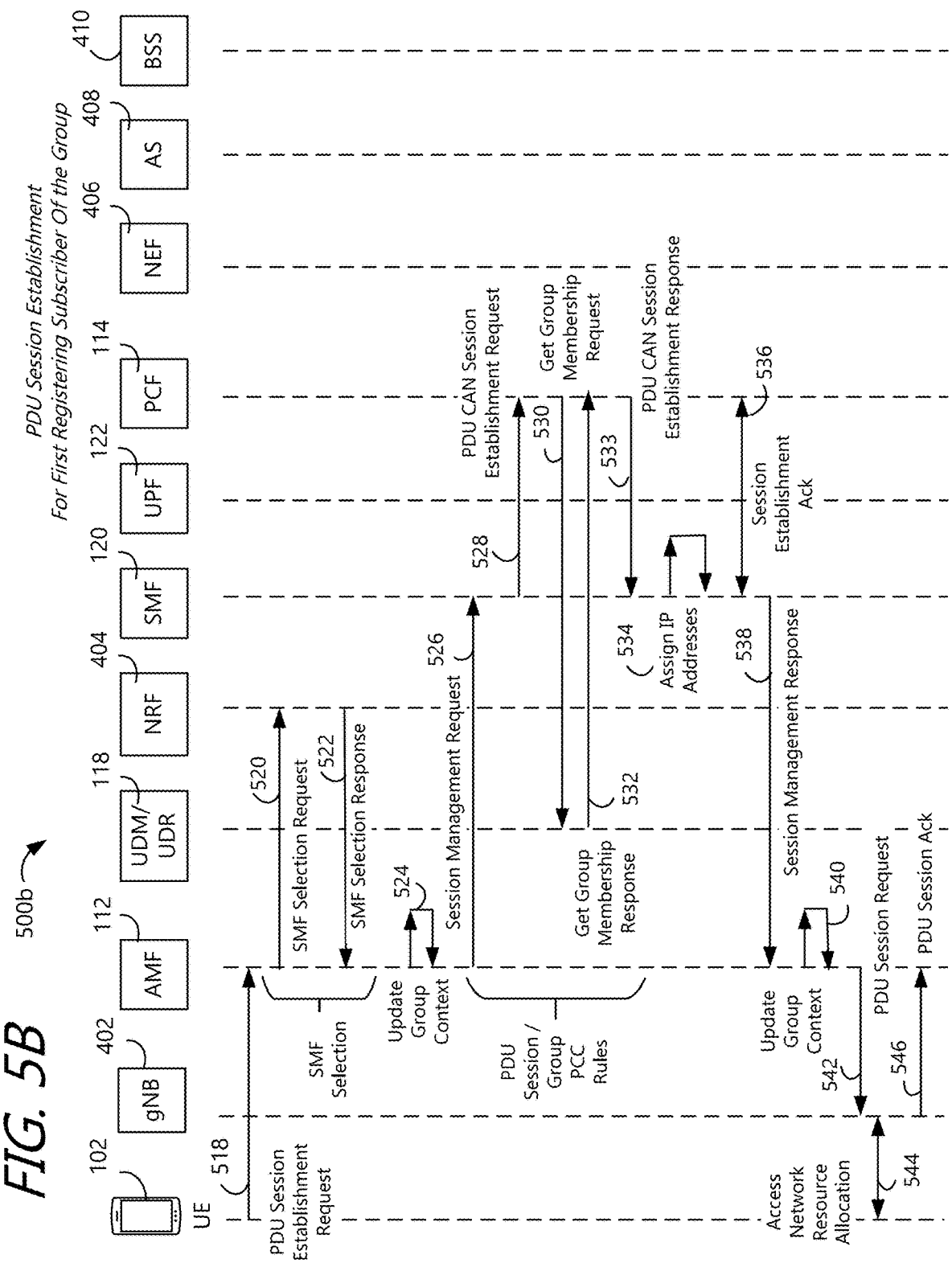

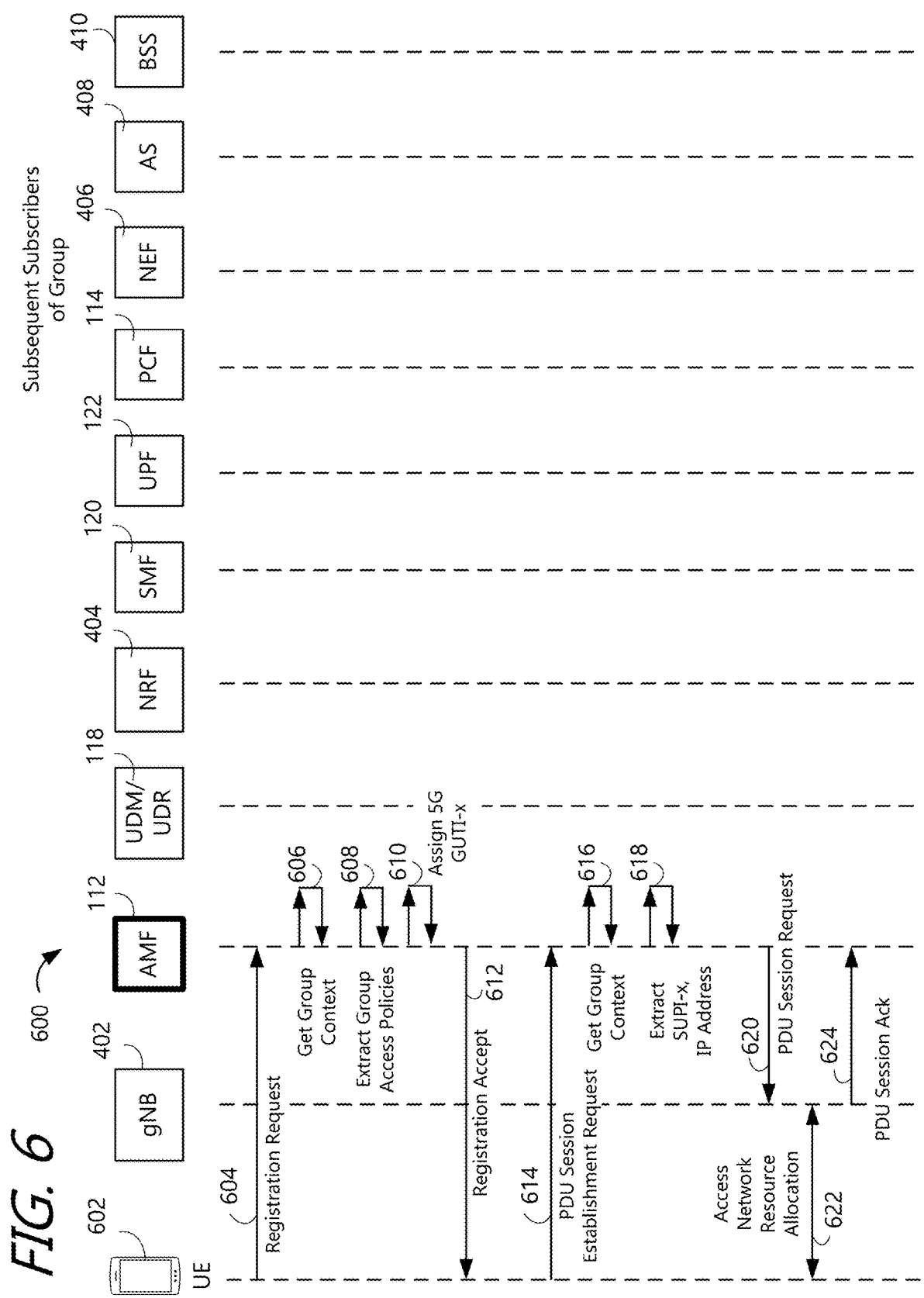

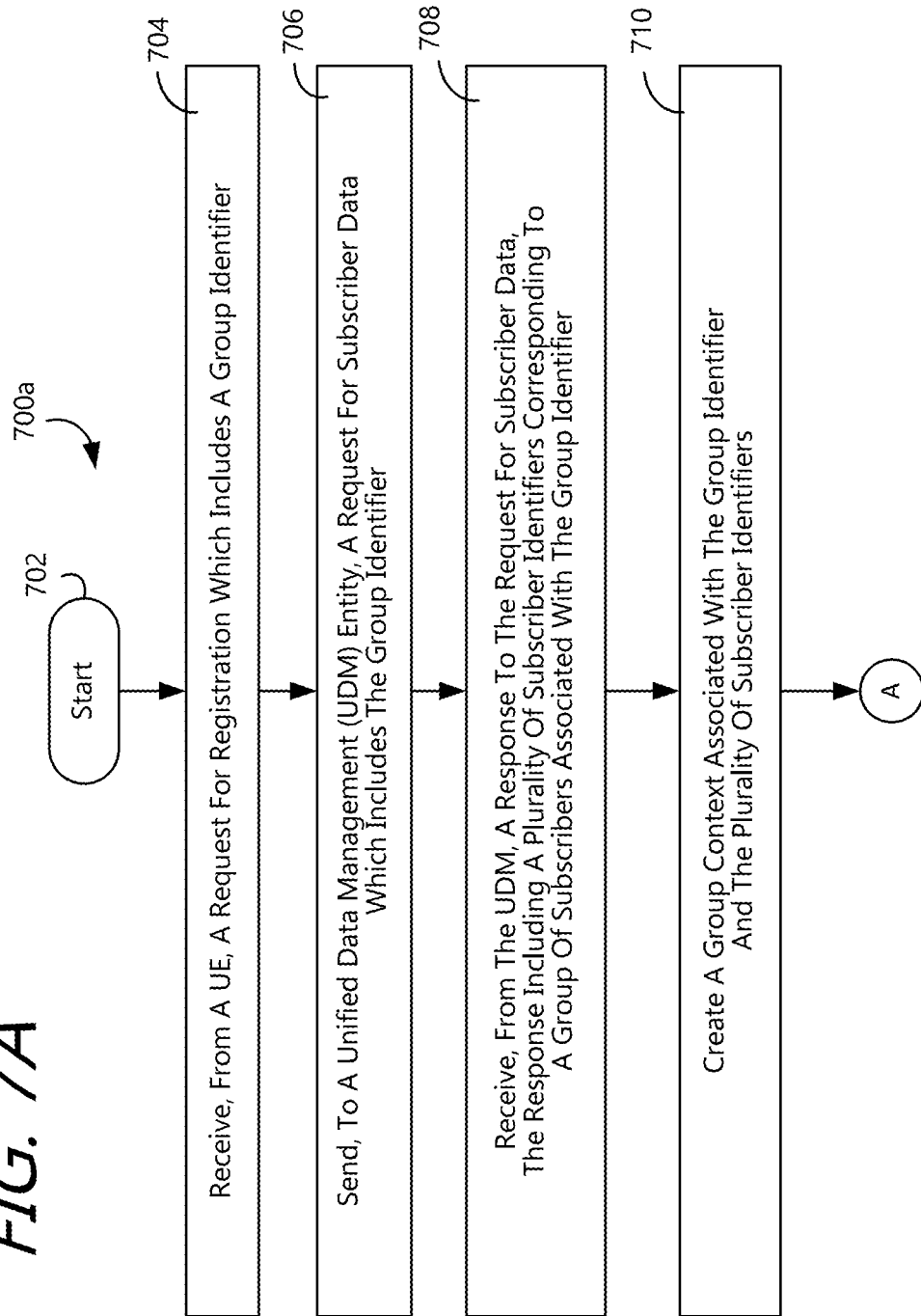

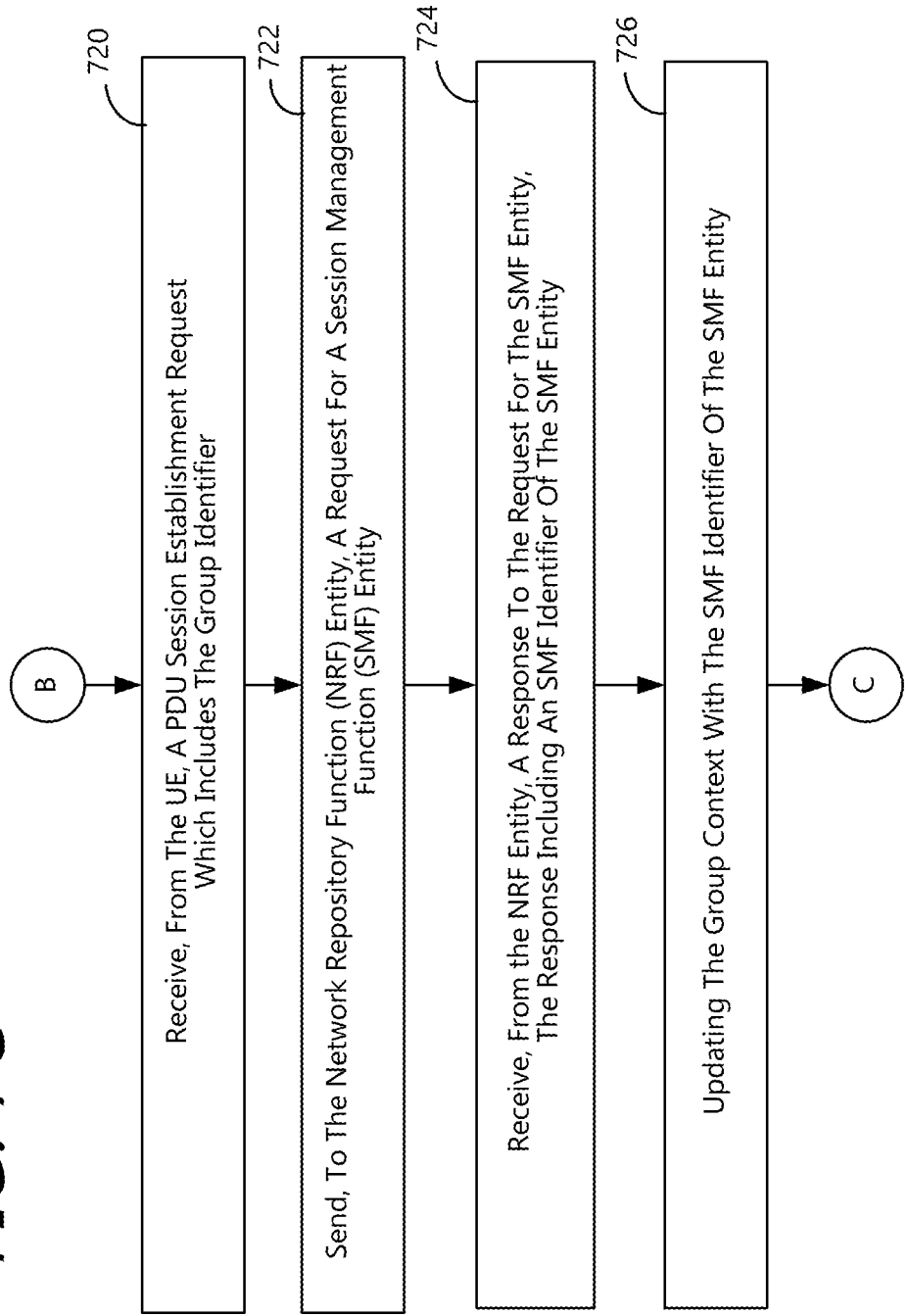

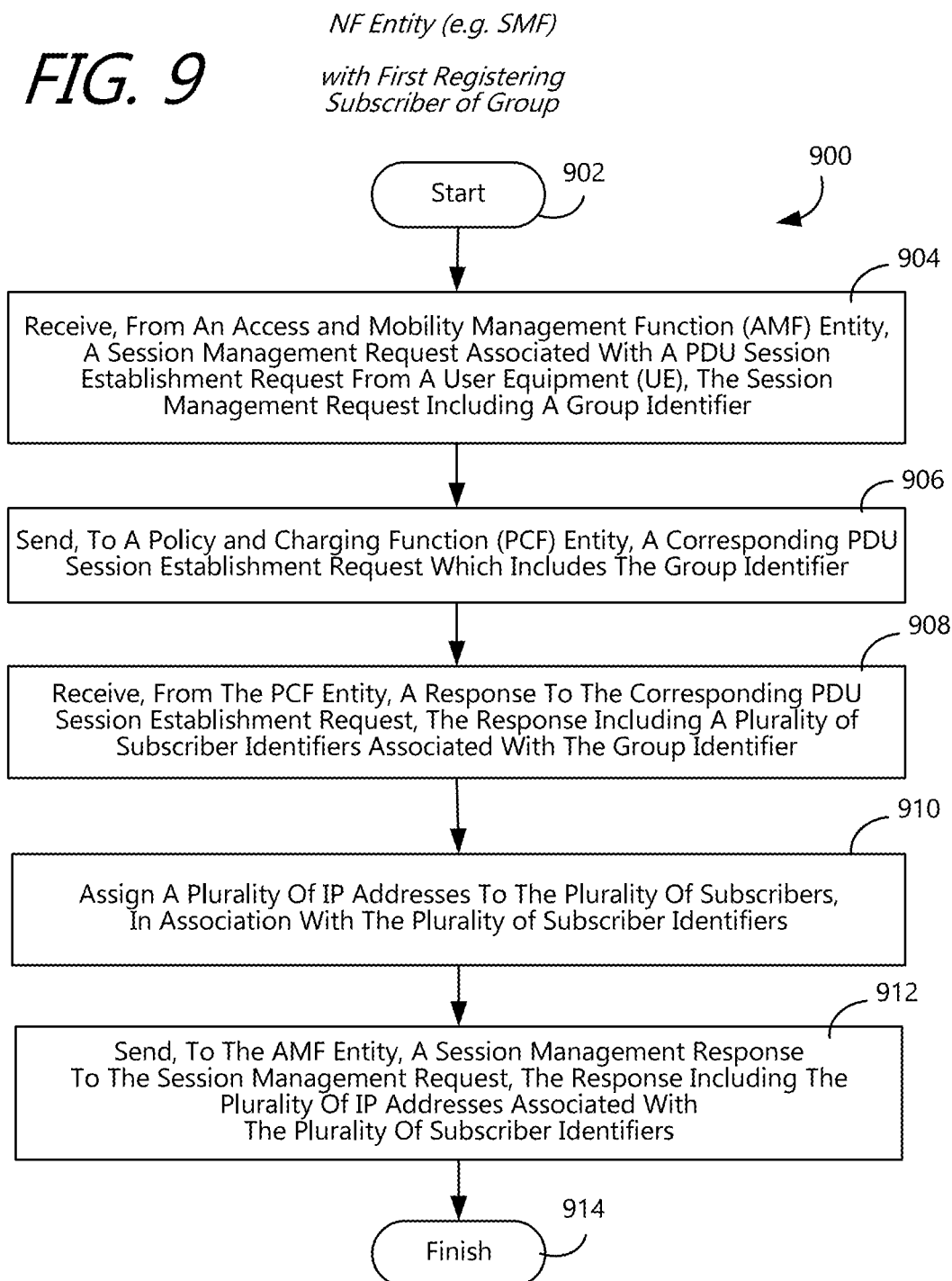

Example setup where network entities are configured *without* inventive techniques Example setup where network entities are configured *with* inventive techniques

METHODS AND APPARATUS FOR ESTABLISHING A GROUP SESSION IN A MOBILE NETWORK FOR SUBSCRIBERS ASSOCIATED WITH A GROUP

TECHNICAL FIELD

The present disclosure relates generally to methods and apparatus for use in establishing a group session in a mobile network for subscribers of a group, and more particularly to establishing a group session in a mobile network for subscribers of a group for reduced signaling load and simplified and improved subscriber management.

BACKGROUND

There is a need for reducing a signaling load in mobile networks, as well as simplifying subscriber management and control over subscribers of user equipment (UE) in such networks, especially when considering the very large and increasing number of devices (e.g. IoT devices) expected to be connected in such networks.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 3A is a flowchart for describing a method for use in establishing a group session for subscribers associated with a group in the 5G mobile network of FIGS. 1A-1B according to some implementations of the present disclosure, which may be used in the methods described in relation to FIG. 2 and FIGS. 4-13;

FIG. 3B is an illustrative representation of a Network Slice Selection Assistance Information (NSSAI) which includes a group identifier, for use in some implementations of the methods of FIGS. 3A and 4-12;

FIG. 4 is a message flow diagram for describing a method for use in establishing a group session for subscribers associated with a group, which involves a group provisioning procedure for a user equipment (UE) and network entities, as well as a group activation procedure;

FIGS. 5A and 5B are message flow diagrams for describing a method for use in establishing a group session for subscribers associated with a group, for a first or initial one of a plurality of subscribers in the group;

FIG. 6 is a message flow diagram for describing a method for use in establishing a group session for subscribers associated with a group, for a subsequent one of a plurality of subscribers in the group;

FIGS. 7A, 7B, 7C, and 7D are flowcharts for describing a method for use in establishing a group session for subscribers associated with a group, for a first one of a plurality of subscribers in the group, which may be performed by an AMF entity;

FIG. 9 is a flowchart for describing a method for use in processing subscribers of groups, for a first one of a plurality of subscribers in the group, which may be performed by an SMF entity;

Figure 1A:
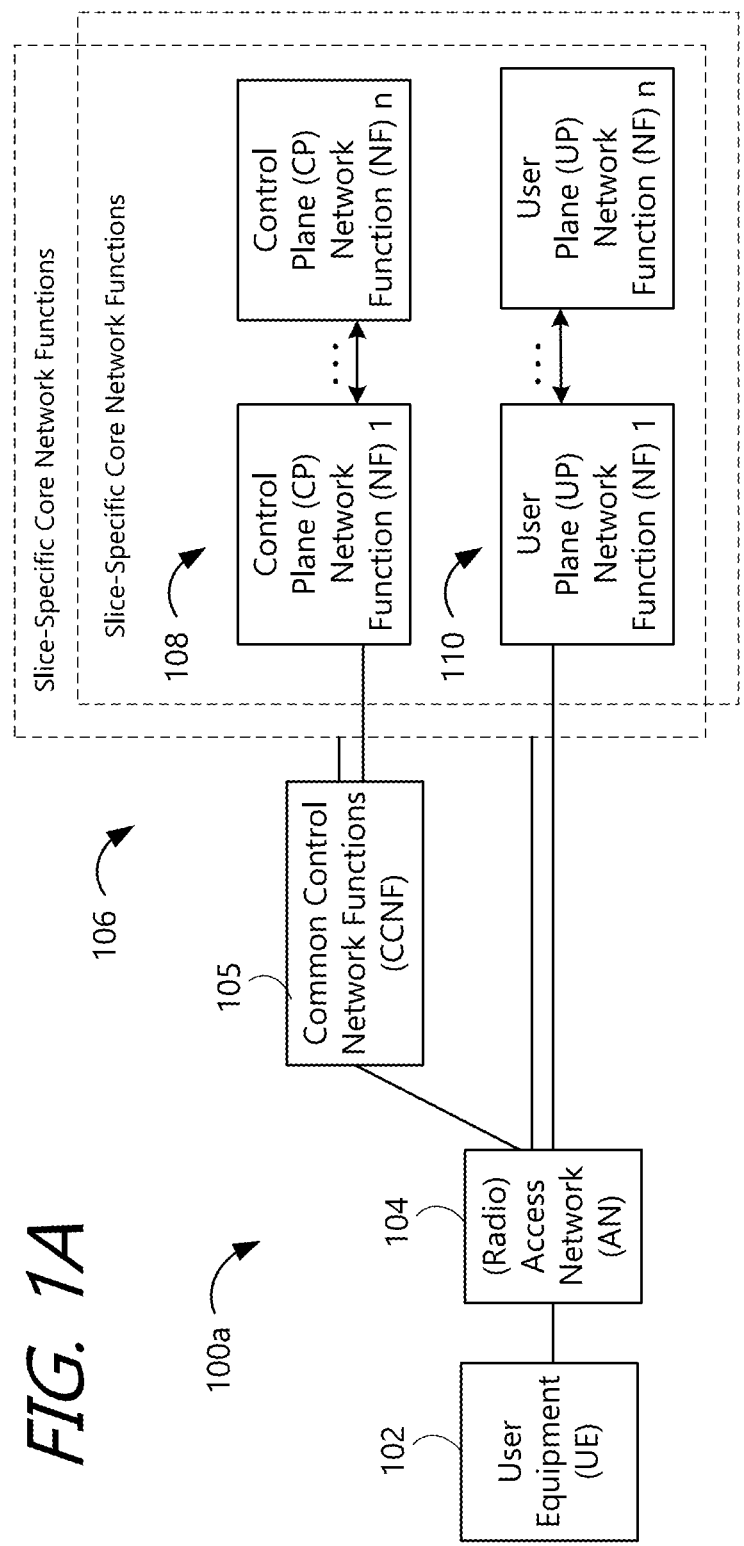
FIG. 1A is an illustrative representation of a basic network architecture of a 5G mobile network.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EXAMPLE EMBODIMENTS

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Overview

What are described herein are methods and apparatus for use in establishing a group session for subscribers associated with a group in a mobile network. The mobile network may be, for example, a 4G or LTE-based mobile network or a 5G mobile network.

The establishment of a group session for subscribers associated with a group according to techniques of the present disclosure may be provided in addition to the establishment of sessions for subscribers individually as is conventional. From the perspective of the mobile network operator, the establishment of a group session in accordance with some implementations of the present disclosure may provide for a reduced signaling load in the mobile network, and/or a more simplified and efficient management and control over the subscribers. From the perspective of the owner or controller of the UEs/subscribers of a group, the establishment of a group session in accordance with some implementations of the present disclosure may provide for a more simplified management and oversight over the subscribers, as well as provide for a better understanding of the (combined) actual, communication needs for the subscriber group.

In an illustrative example for a 5G mobile network, an entity such as an access and mobility management function (AMF) entity may be configured for processing of subscribers of a group. A group of subscribers may be associated with a (unique) group identifier. A plurality of subscriber identifiers associated with subscribers/UEs that are members of the group may be stored in association with the group identifier.

The AMF entity may receive, from a UE, a request for registration which may include network slice selection assistance information (NSSAI). The NSSAI may include the group identifier associated with the group of subscribers. The AMF entity may send, to a unified data management (UDM) entity, a request for subscriber data which includes the group identifier. The AMF entity may receive, from the UDM, a response to the request for subscriber data which includes the plurality of subscriber identifiers corresponding to the group.

For a group session for the group, the AMF entity may create a context for a group session associated with the group identifier, and store this context locally. The AMF entity may store the plurality of subscriber identifiers in association with the context. Further, the AMF entity may obtain selected network functions (NF), selected policies or policy rules, and/or a selected set of assigned IP addresses for the group session, and store this information in association with the context. For one or more subsequently-registering UEs in the group, the AMF entity may retrieve the information from the locally-stored context for inclusion in the already-established group session.

In more detail, the AMF entity may send, to a policy and charging function (PCF) entity, a context establishment request which includes the group identifier. The AMF entity may receive, from the PCF entity, a response to the context establishment request which includes (e.g. group) access policies associated with the group identifier and for the group. The AMF entity may update the locally-stored group context with the group access polices. Note that, for subsequent UEs in the group, the AMF entity may obtain the access policies from the locally-stored context, without again having to receive the policies from the PCF entity.

Even further, the AMF entity may receive, from the UE, a PDU session establishment request which includes the group identifier. The AMF entity may send, to a network repository function (NRF) entity, a request for a session management function (SMF) entity. The AMF entity may receive, from the NRF entity, a response to the request for the SMF entity, where the response includes an SMF identifier of the SMF entity. The AMF entity may update the group context with the SMF identifier of the SMF entity. The AMF entity may send, to the SMF entity, a session request. The AMF entity may receive, from the SMF entity, a session acceptance which includes a plurality of IP addresses assigned to the plurality of subscriber identifiers corresponding to the group of subscribers. The AMF entity may update the locally-stored group context with the plurality of IP addresses assigned to the plurality of subscriber identifiers. Note that, for subsequent UEs in the group, the AMF entity may obtain assigned IP addresses from the locally-stored context, without again having to receive the IP addresses from the SMF entity.

In another illustrative example, a data session between a base station and a UPF is established for a UE. The UE is associated with a first-registering subscriber of a group of subscribers identified by a group identifier. Here, one or more additional UEs associated with one or more subsequently-registering subscribers of the group identified by the group identifier may be included in the data session. The data session may be a packet data unit (PDU) session between the base station and the UPF.

Further, a session between a session management function (SMF) and the UPF may established for the first-registering subscriber. Here, the one or more additional UEs associated with one or more subsequently-registering subscribers of the group identified by the group identifier may be included in the session between the SMF and the UPF. Also further, a session between an access and mobility management function (AMF) and the SMF may established for the UE associated with first-registering subscriber. Here, the one or more additional UEs associated with one or more subsequently-registering subscribers of the group identified by the group identifier may be included in the session between the AMF and the SMF. In addition, a session between the SMF and a policy and charging function (PCF) may established for the UE associated with first-registering subscriber. Here, the one or more additional UEs associated with one or more subsequently-registering subscribers of the group identified by the group identifier may be included in the session between the SMF and the PCF.

Example Embodiments

FIG. 1A is an illustrative representation of a network architecture 100a of a 5G mobile network. Network architecture 100a of the 5G mobile network is configured to support network slicing. In general, network architecture 100a includes common control network functions (CCNF) 105 and a plurality of slice-specific core network functions 106. A user equipment (UE) 102 may obtain access to the mobile network via an access network (AN) 104, which may be a radio access network (RAN). In the present disclosure, the UEs operating in the 5G mobile network may be any suitable type of devices, such as cellular telephones, smart phones, tablet devices, Internet of Things (IoT) devices, and machine-to-machine (M2M) communication devices, to name but a few.

CCNF 105 includes a plurality of network functions (NFs) which commonly support all sessions for UE 102. UE 102 may be connected to and served by a single CCNF 105 at a time, although multiple sessions of UE 102 may be served by different slice-specific core network functions 106. CCNF 105 may include, for example, an access and mobility management function (AMF) and a network slice selection function (NSSF). UE-level mobility management, authentication, and network slice instance selection are examples of common functionalities provided by CCNF 105.

Slice-specific core network functions of network slices 106 are separated into control plane (CP) NFs 108 and user plane (UP) NFs 110. In general, the user plane carries user traffic while the control plane carries network signaling. CP NFs 108 are shown in FIG. 1A as CP NF 1 through CP NF n, and UP NFs 110 are shown in FIG. 1A as UP NF 1 through UP NF n. CP NFs 108 may include, for example, a session management function (SMF), whereas UP NFs 110 may include, for example, a user plane function (UPF).

Figure 1B:
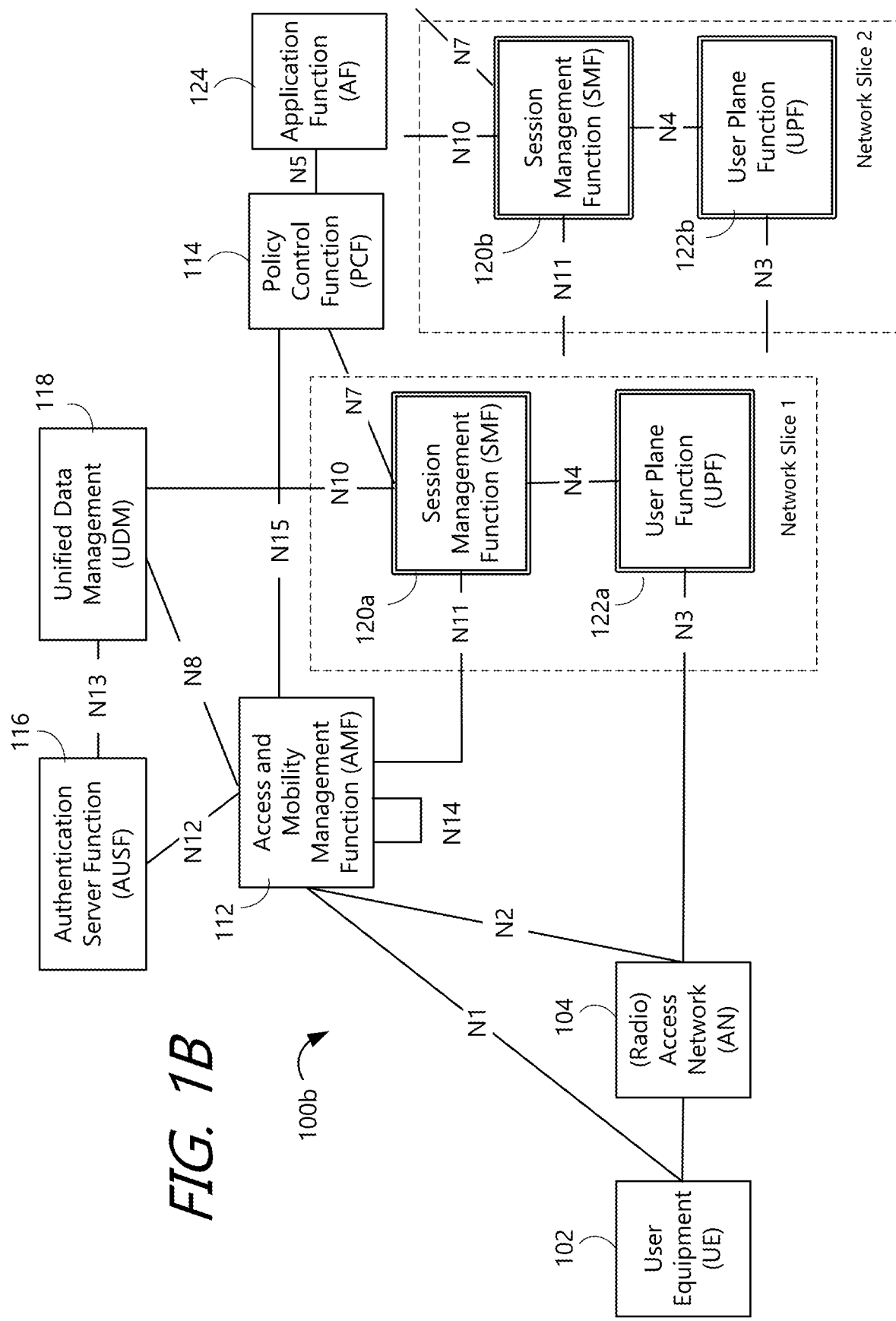
FIG. 1B is an illustrative representation of a more detailed network architecture of the 5G mobile network of FIG. 1A.

FIG. 1B is an illustration of a more detailed network architecture 100b of the 5G mobile network of FIG. 1A. As provided in 3GPP standards for 5G (e.g. 3GPP 23.501), network architecture 100b for a 5G mobile network may include an authentication server function (AUSF) 116, a unified data management (UDM) 118 (having a unified data repository or UDR), an AMF 112, a policy control function (PCF) 114, an SMF 120a, and a UPF 122a. PCF 114 may connect with one or more application functions such as an application function (AF) 124. UPF 122a may connect with one or more data networks (DNs). A plurality of interfaces or reference points N1 through N15 shown in FIG. 1B may define the communications and/or protocols between each of the entities, as described in the relevant (evolving) standards documents.

UPF 106a is part of the user plane and all other NFs (i.e. AMF 112, SMF 120a, PCF 114, AUSF 116, and UDM 118) are part of the control plane. Separating user and control planes guarantees that each plane resource to be scaled independently. It also allows UPFs to be deployed separately from CP functions in a distributed fashion. The NFs in the CP are modularized functions; for example, AMF and SMF are independent functions allowing for independent evolution and scaling.

As illustrated in FIG. 1B, NFs such as SMF 120a and UPF 122a of FIG. 1B may be provided as specific instances in a first network slice (e.g. network slice 1). Additional instances of NFs for additional network slices may be provided as well, as illustrated by SMF 120b and UPF 122b provided as additional specific instances in a second network slice (e.g. network slice 2).

As described in the standards documents, the mobile network will generally deploy a network slice based on a network slice selection assistance information (NSSAI) provided by UE 102. During an initial attach procedure by UE 102, the NSSAI is used by RAN 104 to select the CCNF 105. The NSSF in CCNF 105 selects a network slice instance. In general, network slice instance selection may be based on the NSSAI, the data network name (DNN) of the session, subscription data of UE 102, and other parameters. An attach accept message from the network includes an accepted or allowed NSSAI for UE 102.

There is a need for reducing a signaling load in mobile networks, such as 5G mobile networks of FIGS. 1A-1B, as well as simplifying a subscriber management and control over subscribers of UEs in such networks, especially when considering the very large and increasing number of devices (e.g. IoT devices) expected to be connected in such networks.

According to preferred implementations of the present disclosure, the mobile network of FIGS. 1A-1B may be configured for establishing a group session for subscribers associated with a group (i.e. for those subscribers that are provisioned for such group processing). The establishment of a group session according to the present disclosure may be provided in addition to the establishment of sessions for other subscribers individually as is conventional. From the perspective of the mobile network operator, the establishment of a group session in accordance with some implementations may provide for a reduced signaling load in the mobile network, as well as a more simplified and efficient management and control over the subscribers. From the perspective of the owner or controller of the UEs/subscribers of a group, establishment of a group session in accordance with some implementations of may provide for a more simplified and efficient management and oversight over the subscribers, as well as provide a better understanding of the (combined) actual, communication needs for the subscriber group.

Each group of subscribers may be associated with a (unique) group identifier. A plurality of identifiers of subscribers/UEs that are members of the group may be stored in association with the group identifier associated with the group (e.g. in memory or a DB). In some implementations, one or more policies or policy rules for the group may also be associated with the group, or stored in association with a group type identifier which indicates the type of group. The one or more policies or policy rules may indicate one or more parameters for control and management of the group. The one or more polices may indicate one or more parameters that provide an assurance on the level or extent of communications of the group, and/or one or more parameters that provide a limitation or restriction on the level or extent of communications of the group.

Figure 2:
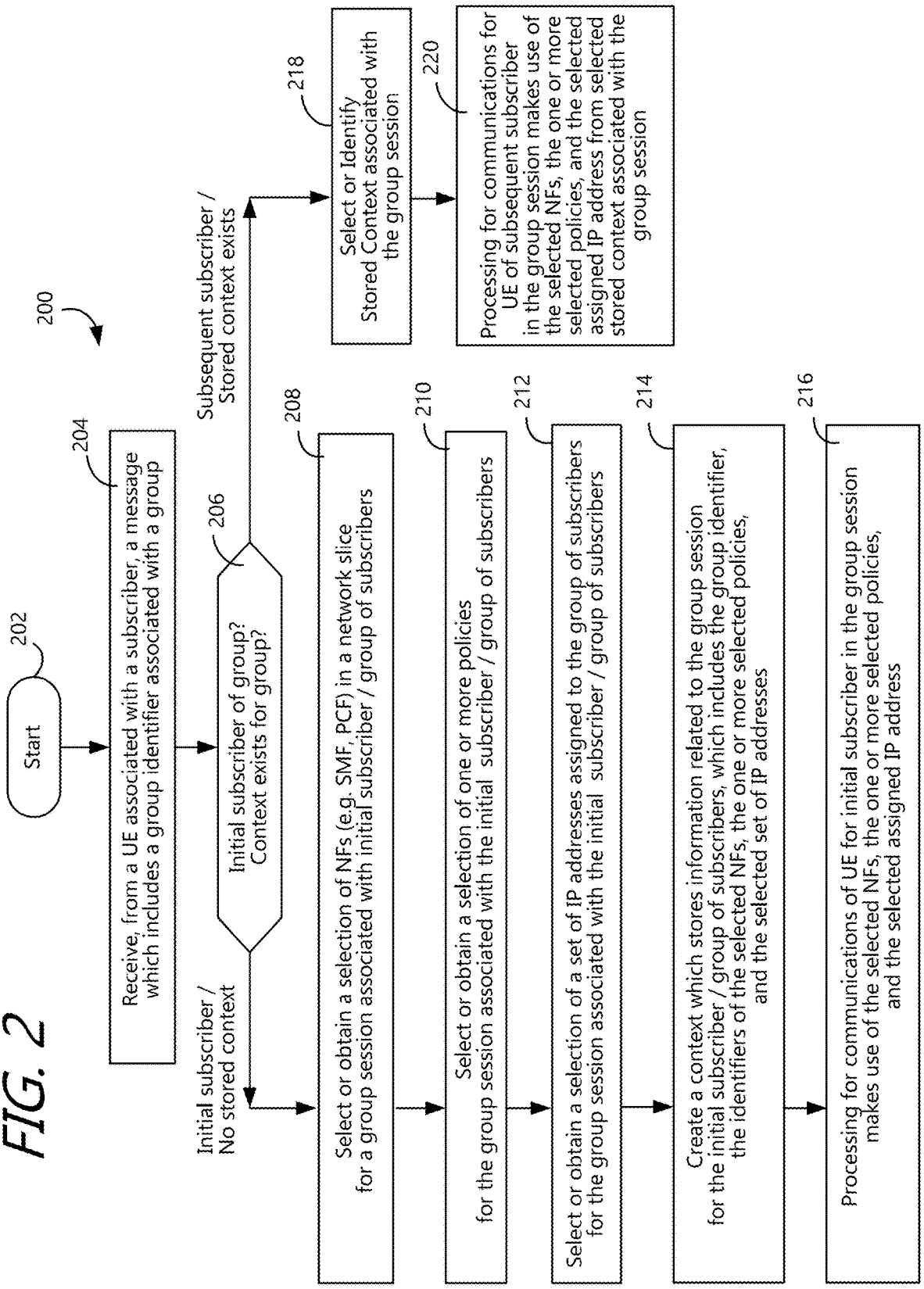
FIG. 2 is a flowchart for describing a method for use in establishing a group session for subscribers associated with a group in the 5G mobile network of FIGS. 1A-1B according to some implementations of the present disclosure.

FIG. 2 is a flowchart 200 for describing a method for use in establishing a group session for subscribers associated with a group according to some implementations of the present disclosure. The method described in relation to FIG. 2 may be an overview and/or generalization of the techniques described in relation to FIGS. 3-12. The method of FIG. 2 may be performed by one or more entities or network function (NF) entities (e.g. an AMF) and/or provided in a server or network device or equipment. The method of FIG. 2 may be embodied as a computer program product including a non-transitory computer readable medium and instructions (e.g. instructions provided in a VNF or NFV module) stored in the non-transitory computer readable medium, where the instructions are executable on one or more processors of the server or network equipment for performing the steps of the method. The method of FIG. 2, and related techniques described in relation to FIGS. 3-12, may be especially suitable in situations where a relatively large number of devices (e.g. IoT devices) are deployed and have the same or similar communication needs.

Beginning at a start block 202 of FIG. 2, a message which includes a group identifier associated with a group is received (step 204 of FIG. 2). The message may be associated with the establishment of a session for communications for a UE. The message may be a message from the UE of the subscriber, such as a message for registration of the UE. The message may include network slice selection assistance information (NSSAI) which includes the group identifier.

It is identified whether the message is associated with or from the first or initial subscriber of the group, and/or whether any stored context for the subscriber or group exists (step 206 of FIG. 2). If the message is identified to be associated with or from the first or initial subscriber of the group, and/or if any stored context for the subscriber or group is identified to exist at step 206, then the method proceeds to step 208 of FIG. 2. Otherwise, if the message is identified to be associated with or from a subsequent subscriber of the group, and/or if it is identified that a stored context for the subscriber or group exists at step 206, then the method proceeds to step 218 of FIG. 2.

For an initial subscriber identified in step 206, one or more network functions (NF) in a network slice may be selected or obtained for a group session associated with the initial subscriber/group of subscribers (step 208 of FIG. 2). The selection of NFs for the initial subscriber in step 208 may be viewed as selection of NFs for or on behalf of the entire group of subscribers. The selected NFs may include, for example, an SMF, a PCF, a UPF, or any combination thereof.

One or more polices may be selected or obtained for the group session associated with the initial subscriber/group of subscribers based on the group identifier (step 210 of FIG. 2). Further, a set of IP addresses assigned to a plurality of subscribers/UEs in the group may be selected or obtained (step 212 of FIG. 2). That is, each IP address of the set is assigned to (or for assignment to) a respective one of the plurality of subscriber identifiers of the group. The selected IP addresses may be provided and/or stored in association with the identifiers of the subscriber/UEs in the group. The set of IP addresses includes an IP address assigned to the initial subscriber of the group, as well as IP addresses pre-assigned to subsequent subscribers of the group.

A context associated with the group session for the initial subscriber/group of subscribers may be created (step 212 of FIG. 2). Information related to the group session for the initial subscriber/group of subscribers may be stored in this "group" context, upon or after creation of the context. In particular, the group context may include the group identifier and the identifiers of the subscribers/UEs in the group. In addition, the group context may include the one or more identifiers of the one or more selected NFs (e.g. obtain in relation to step 208). Further, the group context may include the one or more selected policies or policy rules of the group (e.g. obtained in relation to step 210). Even further, the group context may include the set of IP addressed stored in association with the identifiers of the subscriber/UEs in the group (e.g. obtained in relation to step 212).

Processing for communications of the UE for the initial subscriber in the group session makes use of the selected NFs, the one or more selected policies or policy rules, and the selected assigned IP address (step 216 of FIG. 2).

For a subsequent subscriber identified in step 206, the stored context associated with the group identifier and group session is selected or identified (step 218 of FIG. 2). The proper selection or identification of the group context may be made based on the group identifier and/or the identifier of the subsequent subscriber (e.g. performing a comparison of the group identifiers and/or subscriber identifiers for a match). Session establishment for communications of the UE for the subsequent subscriber makes reference and use of the information stored in the group context of the group session (step 216 of FIG. 2). That is, session establishment for communications of the UE for the subsequent subscriber uses the selected NFs, the one or more selected policies or policy rules, and the selected assigned IP address from the stored group context.

Thus, processing for the subsequent subscriber involved steps 204, 206, and 208, but not the more complex processing associated with steps 208, 210, 212, 214, and 216. Processing for each remaining subsequent subscriber of the group may involve the same processing associated with steps 204, 206, 218 and 220, but not the more complex processing associated with steps 208, 210, 212, 214, and 216.

FIG. 3A is a flowchart 300 for describing a method for use in establishing a group session for subscribers associated with a group according to some implementations of the present disclosure. Beginning at a start block 302 of FIG. 3A, a Network Slice Selection Assistance Information (NSSAI) is generated or obtained (step 304 of FIG. 3A). The NSSAI includes a group identifier or "Group ID" associated with a group of subscribers. A UE associated with a subscriber of the group may be provisioned with the NSSAI which includes the group identifier (step 306 of FIG. 3A). In addition, network entities may be provisioned with the group identifier. The flowchart ends at a finish block 308 of FIG. 3A, but may be repeated for additional groups of subscribers.

In FIG. 3B, an illustrative representation of a NSSAI 310 which includes a group identifier 312 is shown. Per 5G standards, a NSSAI is defined and intended to include a field for a slice/service type (SST) which refers to the expected network slice behavior in terms of features and services, and a field for a slice differentiator (SD) which is optional information that compliments the slice/service type to differentiate amongst multiple network slices of the same slice/service type. In some preferred implementations of techniques of the present disclosure, the group identifier of the present disclosure is included or encoded in the field for SD of the NSSAI, as indicated in FIG. 3B.

FIG. 4 is a message flow diagram 400 of a method for use in processing a plurality of subscribers of a group according to some implementations of the present disclosure. Additional entities in FIG. 4 that are not shown in FIGS. 1A-1B include a network repository function (NRF) 404, a network exposure function (NEF) 406, an application server (AS) 408, and a business support system (BSS) 410. Also indicated in FIG. 4 is a base station or gNodeB (gNB) 402 for radio communications with UE 102.

In FIG. 4, UE 102 is provisioned with a group identifier corresponding to a group of subscribers (step 420 of FIG. 4). The group identifier may be included or encoded as part of the NSSAI (e.g. in the field for SD) associated with the UE 102 (see e.g. the method of FIGS. 3A-3B).

In addition, BSS 410 or other suitable system may perform a group provisioning procedure in order to provision group provisioning information in the mobile network. The group provisioning information may include the group identifier and a plurality of subscriber identifiers associated with the group identifier. The plurality of subscriber identifiers correspond to a plurality of subscribers associated with the group. As illustrated in FIG. 4, BSS 410 provisions AS 408 (step 422 of FIG. 4), NEF 406 (step 424 of FIG. 4), and UDM/UDR 120 (step 426 of FIG. 4) with the group provisioning information. Subsequently, AS 408 may perform a group activation procedure to activate a subscription for the group of subscribers. In particular, AS 408 may perform activation processes with respect to NEF 428 (step 428 of FIG. 4) and UDM/UDR 120 (step 430 of FIG. 4).

FIG. 5A is a message flow diagram 500a for describing a method for use in performing processing of subscribers of a group according to some implementations of the present disclosure. FIG. 5A relates to processing of the first one of the group of subscribers (e.g. for the first-registered subscriber of the group).

To begin in FIG. 5A, UE 102 sends a request for registration to the mobile network (step 502 of FIG. 5A). The request for registration is received by AMF 110. The request for registration may include a subscriber identifier. The request for registration may further include the group identifier or, more specifically, the NSSAI which includes the group identifier.

It is identified whether UE 102 is the first subscriber of the group to register, and/or whether a group context has not yet been created for the group. If yes, then AMF 110 sends to UDM/UDR 120 a request for subscriber data associated with the group (step 504 of FIG. 5). The request includes the group identifier or, more specifically, the NSSAI which includes the group identifier. In response, UDM/UDR 120 retrieves subscriber data associated with the group based on the group identifier. The retrieved subscriber data includes a plurality of subscriber identifiers associated with the group identifier. UDM/UDR 120 sends a response to the request to AMF 110, where the response includes the plurality of subscriber identifiers associated with the group identifier (step 506 of FIG. 5A). AMF 110 receives this information. AMF 110 creates a group context associated with the group identifier (step 508 of FIG. 5A). AMF 110 associates or includes the plurality of subscriber identifiers with the group context. The group context is stored locally at the AMF 110.

Next, AMF 110 sends to PCF entity 114 a context establishment request which includes the group identifier or, more particularly, the NSSAI which includes the group identifier (step 510 of FIG. 5A). PCF entity 114 retrieves (e.g. group) access policies based on the group identifier. AMF 110 receives, from PCF entity 114, a response to the context establishment request (step 512 of FIG. 5). The response includes the access policies associated with the group identifier. AMF 110 updates the locally-stored group context with the access policies (step 514 of FIG. 5A). AMF 110 sends to UE 102 an acceptance to the request for registration (step 516 of FIG. 5A). The acceptance includes the access policies associated with the group.

FIG. 5B is a message flow diagram 500b for describing a method for use in establishing a group session for subscribers associated with a group according to some implementations of the present disclosure. The method shown and described in relation to message flow diagram 500b of FIG. 5B relates to processing of the first one of the group of subscribers (e.g. for the first-session-requesting subscriber of the group). The method of FIG. 5B may be performed (immediately) after the method of FIG. 5A described above.

To begin in FIG. 5B, UE 102 sends a PDU session establishment request to the mobile network (step 518 of FIG. 5B). The PDU session establishment request, which includes the group identifier (or NSSAI which includes the group identifier), is received by AMF 110. It is identified that UE 102 is the first subscriber of the group to request a PDU session to be established. In response, AMF 110 sends to session management function (SMF) selection request to NRF 204 (step 520 of FIG. 5B). The request may include the group identifier or, more specifically, the NSSAI which includes the group identifier. In response, NRF 204 creates an instance of a SMF associated with an SMF identifier. NRF 204 sends to AMF 110 an SMF selection response which includes the SMF identifier (step 522 of FIG. 5B). AMF 110 receives this response, and updates the group context with the SMF identifier of the SMF entity (step 524 of FIG. 5B).

Subsequently, AMF 110 sends a session management request to SMF 112 identified by the SMF identifier (step 526 of FIG. 5B). The session management request includes the group identifier or, more specifically, the NSSAI which includes the group identifier. In response, SMF 112 sends a corresponding PDU CAN session establishment request to PCF 114 (step 528 of FIG. 5B). PCF 114, in turn, sends to UDM/UDR 120 a get group membership request which includes the group identifier (step 530 of FIG. 5B). In response, UDM/UDR 120 retrieves the plurality of subscriber identifiers using the group identifier. UDM/UDR 120 sends a get group membership response to the request to PCF 114 (step 532 of FIG. 5B), where the response includes the plurality of subscriber identifiers associated with the group identifier. PCF 114 receives this response. PCF 114 sends to SMF 112 a PDU CAN session establishment response (step 533 of FIG. 5B).

The response, which is received by SMF 112, includes the set of subscriber identifiers associated with the group identifier. Then, SMF 112 assigns a unique IP address to each subscriber/subscriber identifier in the group (step 534 of FIG. 5B). Thus, a set of IP addresses are assigned to the plurality of subscriber identifiers (e.g. IMSIs) associated with the entire group. Session establishment and acknowledgement messages are exchanged between SMF 112 and UPF 106 for establishing the PDU session (step 536 of FIG. 5B). Step 536 may particularly include an N4 session establishment message.

SMF 112 sends to AMF 110 a session management response to AMF 110 identified by the SMF identifier (step 526 of FIG. 5B). The session management response includes the set of assigned IP addresses associated with the plurality of subscriber identifiers (e.g. IMSIs). AF 110 receives the session management response, and updates the group context to associate the assigned IP addresses with their corresponding subscriber identifiers (step 540 of FIG. 5B).

AMF 110 then sends a PDU session request to gNB 402 for establishing the PDU session (step 542 of FIG. 5B). The PDU session request may include the IP address assigned to UE 102 for the PDU session. More particularly, the PDU session request in step 542 may be an N2 PDU Session Request, non-access stratum (NAS) message. The gNB 402 then allocates resources of the access network for UE 102 for the PDU session (step 544 of FIG. 5B). AMF 110 receives from gNB 402 a PDU session ack (step 546 of FIG. 5B).

FIG. 6 is a message flow diagram 600 for describing a method for use in establishing a group session for subscribers associated with a group according to some implementations of the present disclosure. FIG. 6 relates to processing of any subsequent one of the group of subscribers, subsequent to the first one of the subscribers of the group (e.g. for any subsequently-registering subscriber of the group). The method of FIG. 6 may be performed after the methods of FIGS. 5A and 5B are performed with the first UE 102 of the group.

To begin in FIG. 6, a subsequent UE 602 sends a request for registration to the mobile network (step 604 of FIG. 6). The request for registration is received by AMF 110. The request for registration may include a subscriber identifier. The request for registration may further include the group identifier or, more specifically, the NSSAI which includes the group identifier. It is identified whether UE 602 is the first subscriber of the group to register, and/or whether a group context has already been created for the group. If not (i.e. UE 602 is a subsequent subscriber, and/or a group context has already been created for the group), then AMF 110 accesses the group context (step 606 of FIG. 6) and extracts the access policies from the group context (step 608 of FIG. 6). Note that the access policies were already/ previously obtained by AMF 110 via PCF entity 114 in response to the first registration of the first subscriber of the group. AMF 110 assigns a 5G globally unique temporary identifier (GUTI) to UE 602 (step 610 of FIG. 6). AMF 110 sends to UE 102 an acceptance to the request for registration (step 612 of FIG. 6). The acceptance includes the access policies associated with the group.

Next, UE 602 sends a PDU session establishment request to the mobile network (step 614 of FIG. 6). The PDU session establishment request, which includes the group identifier (or the NSSAI which includes the group identifier), is received by AMF 110. It is identified whether UE 602 is the first subscriber in the group to request a PDU session, and/or whether a PDU session has not yet been established for the group. If not (i.e. UE 602 is indeed a subsequent subscriber for the already-established PDU session), then AMF 110 accesses the group context (step 616 of FIG. 6) and extracts from the group context the assigned IP address corresponding to the subscriber's identifier (step 618 of FIG. 6). Note that the IP addresses for the entire group were already/previously obtained by AMF 110 via SMF 112 in response to the initial establishment of the PDU session.

AMF 110 then sends a PDU session request to gNB 402 for establishing the PDU session (step 542 of FIG. 5B). The PDU session request may include the IP address assigned to UE 102 for the PDU session. More particularly, the PDU session request in step 542 may be an N2 PDU Session Request, non-access stratum (NAS) message. The gNB 402 then allocates resources of the access network for UE 102 for the PDU session (step 544 of FIG. 5B). AMF 110 receives from gNB 402 a PDU session ack (step 546 of FIG. 5B).

FIG. 7A is a flowchart 700a for describing a method for use in performing processing of subscribers of a group according to some implementations of the present disclosure. The method of FIG. 7A may be performed by a network entity or device in a mobile network, such as an access and mobility management function (AMF) entity in a 5G mobile network. FIG. 7A may relate to processing of the first one of the group of subscribers (e.g. for the first-registered subscriber of the group).

Figure 7B:
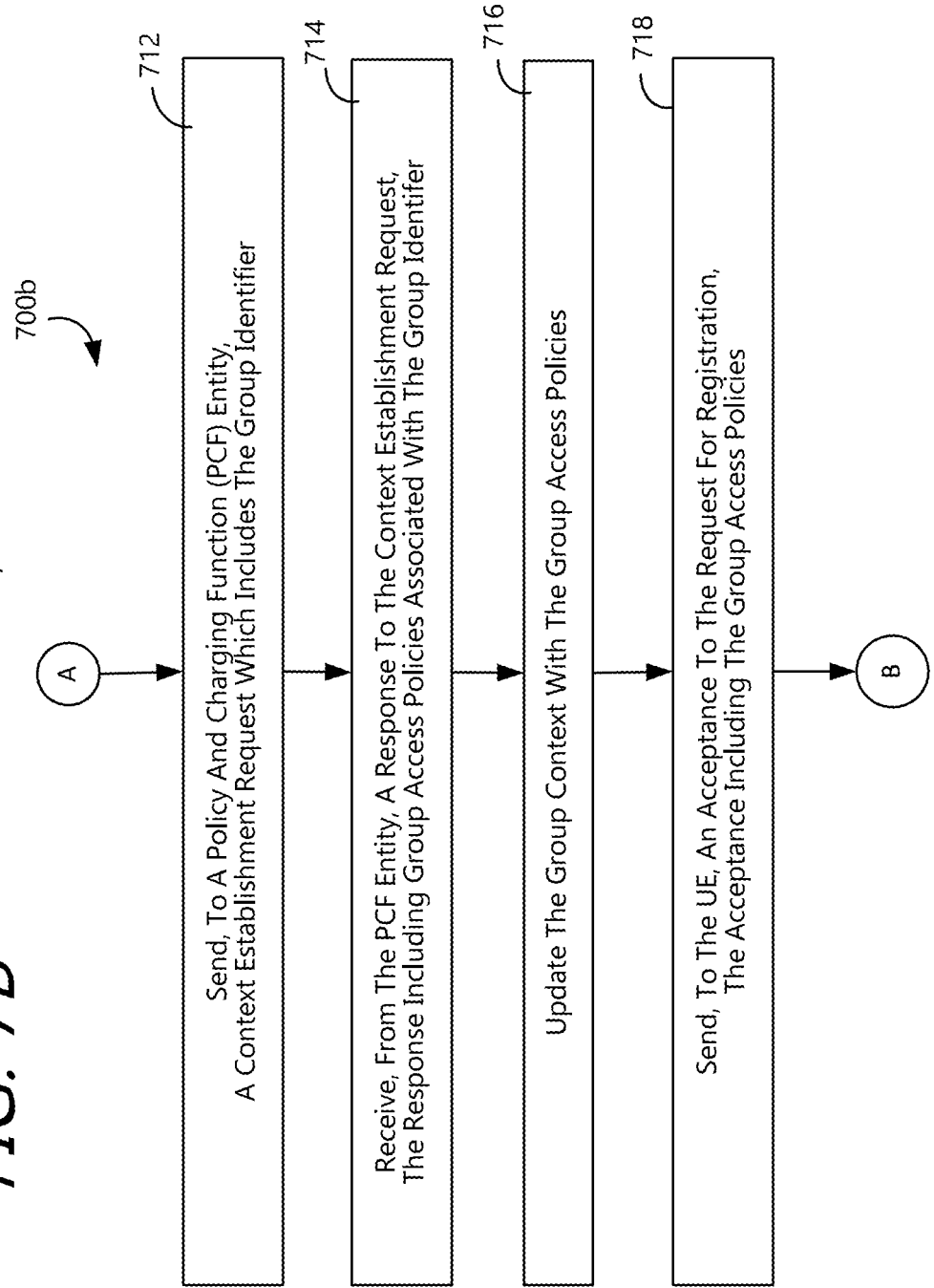

Beginning at a start block 702 of FIG. 7A, an AMF entity may receive, from a user equipment (UE), a request for registration (step 704 of FIG. 7A). The request for registration may include a subscriber identifier. The request for registration may further include the group identifier or, more specifically, the NSSAI which includes the group identifier. The AMF entity may send, to a unified data management (UDM) entity, a request for subscriber data (step 706 of FIG. 7A). The request for subscriber data includes the group identifier or the NSSAI which includes the group identifier. The AMF entity may receive, from the UDM, a response to the request for subscriber data, where the response includes a plurality of subscriber identifiers associated with the group identifier (step 708 of FIG. 7A). The AMF entity may create a group context associated with the group identifier and the plurality of subscriber identifiers (step 710 of FIG. 7A). Note that the group identifier in this method may be encoded and communicated in network slice selection assistance information (NSSAI) associated with the UE. The method may continue through a connector A to the method of FIG. 7B, described below.

FIG. 7B is a flowchart 700b for describing a method for use in processing of subscribers of a group according to some implementations of the present disclosure. The method of FIG. 7B may be performed by a network entity or device in a mobile network, such as AMF entity in a 5G mobile network. FIG. 7B may relate to processing of the first one of the group of subscribers (e.g. for the first-registered subscriber of the group). The method of FIG. 7B may be a separate method, or a continuation of the method of FIG. 7A via the connector A.

To begin in FIG. 7B, an AMF entity may send, to a policy and charging function (PCF) entity, a context establishment request which includes the group identifier (step 712 of FIG. 7B). The AMF entity may receive, from the PCF entity, a response to the context establishment request, where the response includes access policies associated with the group identifier (step 714 of FIG. 7B). The AMF entity may update the group context with the access policies (step 716 of FIG. 7B). The AMF entity may send, to the UE, an acceptance to the request for registration, where the acceptance including the access policies (step 718 of FIG. 7B). Note that the group identifier in this method may be encoded and communicated in network slice selection assistance information (NSSAI) associated with the UE. The method may continue through a connector B to the method of FIG. 7C, described below.

FIG. 7C is a flowchart 700c for describing a method for use in establishing a group session for subscribers associated with a group according to some implementations of the present disclosure. The method of FIG. 7C may be performed by a network entity or device in a mobile network, such as AMF entity in a 5G mobile network. FIG. 7C may relate to processing of the first one of the group of subscribers (e.g. for the first-registered or first-session-establishing subscriber of the group). The method of FIG. 7C may be a separate method, or a continuation of the method of FIG. 7B via the connector B.

To begin in FIG. 7C, the AMF entity may receive, from the UE, a PDU session establishment request which includes the group identifier (step 720 of FIG. 7C). The AMF entity may send, to a network repository function (NRF) entity, a request for a session management function (SMF) entity (step 722 of FIG. 7C). The AMF entity may receive, from the NRF entity, a response to the request for the SMF entity, where the response includes an SMF identifier of the SMF entity (step 724 of FIG. 7C). The AMF entity may update the group context with the SMF identifier of the SMF entity (step 726 of FIG. 7C). Note that the group identifier in this method may be encoded and communicated in network slice selection assistance information (NSSAI) associated with the UE. The method may continue through a connector C to the method of FIG. 7D, described below.

Figure 7D:
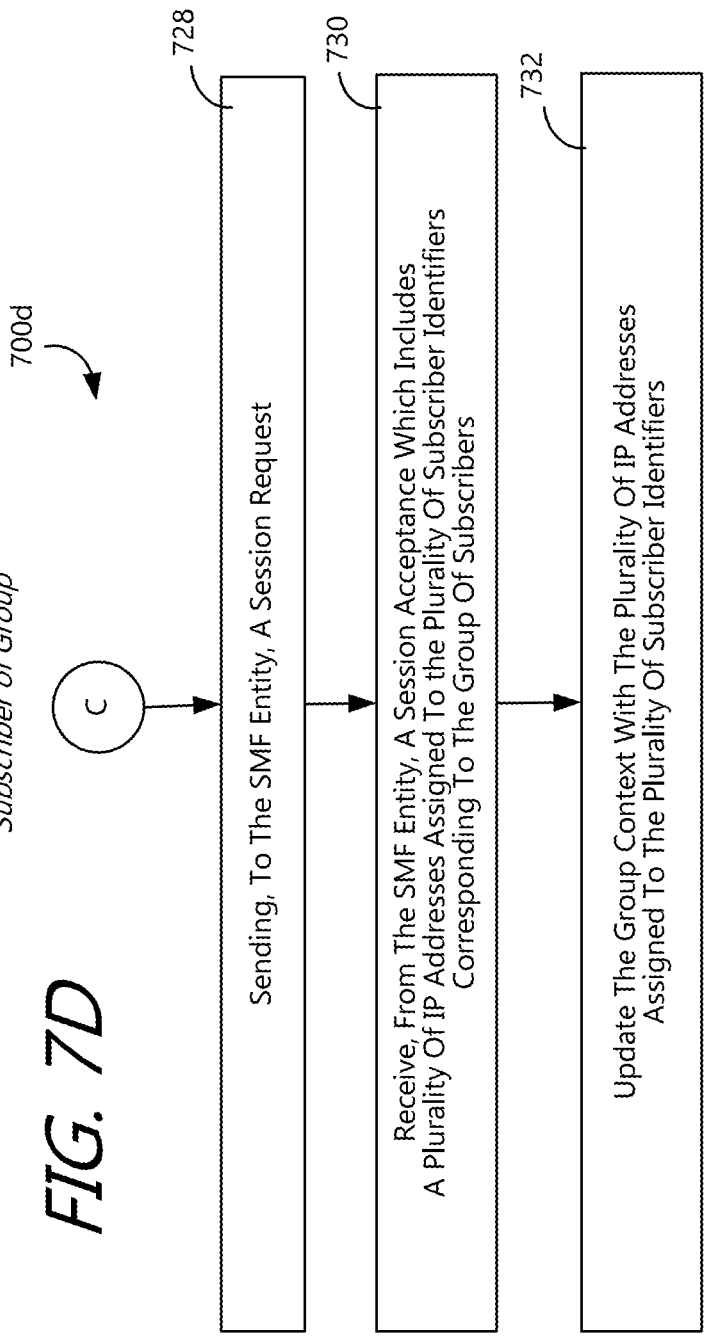

FIG. 7D is a flowchart 700d for describing a method for use in establishing a group session for subscribers associated with a group according to some implementations of the present disclosure. The method of FIG. 7D may be performed by a network entity or device in a mobile network, such as AMF entity in a 5G mobile network. FIG. 7D may relate to processing of the first one of the group of subscribers (e.g. for the first-registered or first-session-establishing subscriber of the group). The method of FIG. 7D may be a separate method, or a continuation of the method of FIG. 7C via the connector C.

To begin in FIG. 7D, the AMF entity may send, to the SMF entity, a session request (step 728 of FIG. 7D). The session request may include the group identifier or, more specifically, the NSSAI which includes the group identifier. The AMF entity may receive, from the SMF entity, a session acceptance which includes a set of IP addresses assigned to the plurality of subscriber identifiers corresponding to the group of subscribers (step 730 FIG. 7D). Each IP address of the set is assigned to (or for assignment to) a respective one of the plurality of subscriber identifiers of the group. The AMF entity may update the group context with the plurality of IP addresses assigned to the plurality of subscriber identifiers (step 732 of FIG. 7D). Note that the group identifier in this method may be encoded and communicated in network slice selection assistance information (NSSAI) associated with the UE.

Figure 8A:
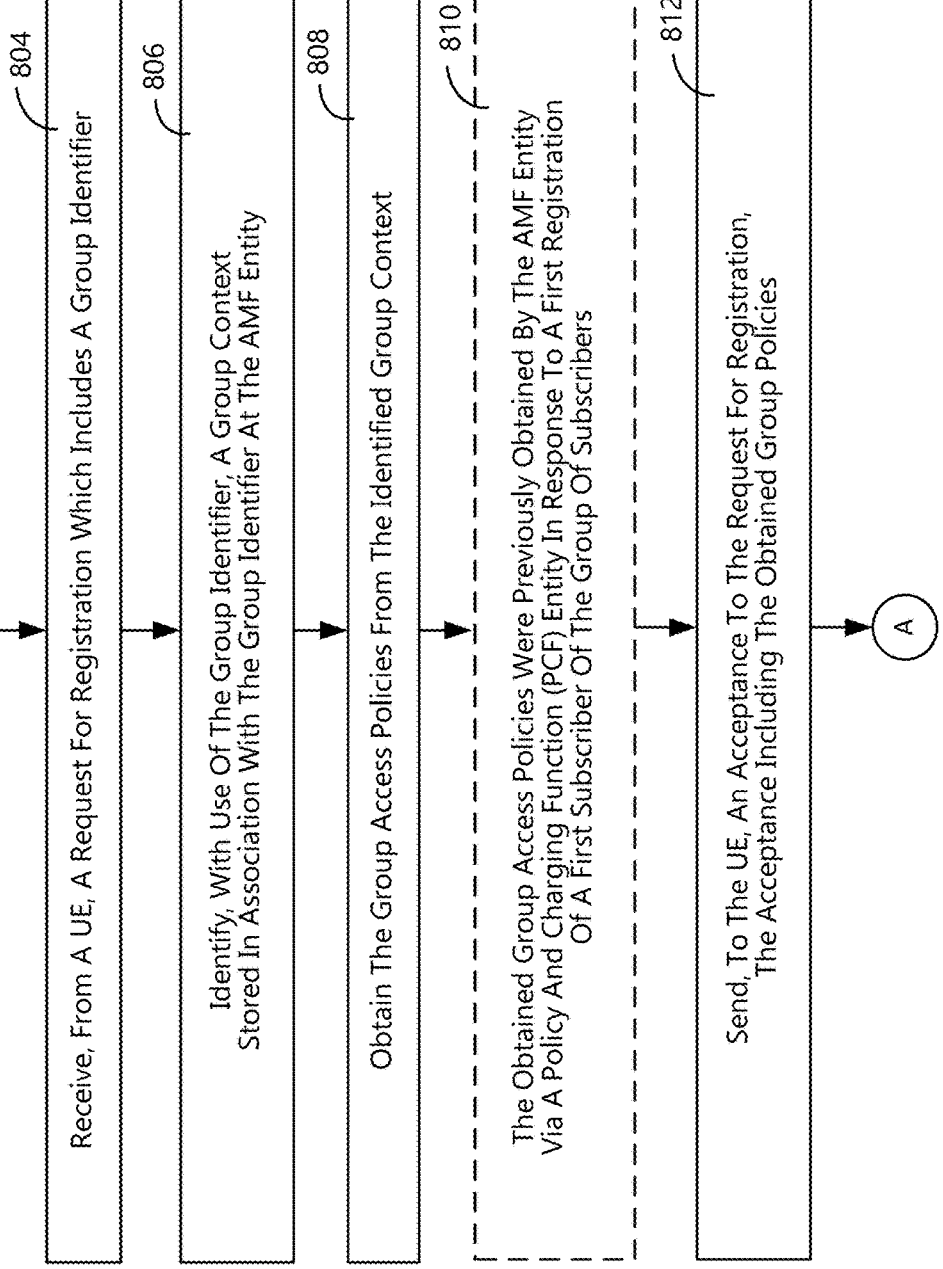
FIGS. 8A and 8B are flowcharts for describing a method for use in establishing a group session for subscribers associated with a group, for a subsequent one of a plurality of subscribers in the group, which may be performed by an AMF entity.

FIG. 8A is a flowchart 800a for describing a method for use in establishing a group session for subscribers associated with a group according to some implementations of the present disclosure. The method of FIG. 8A may be performed by a network entity or device in a mobile network, such as an AMF entity in a 5G mobile network. FIG. 8A may relate to processing of any subsequent one of the group of subscribers, subsequent to the first one of the subscribers of the group (e.g. for any subsequently-registering subscriber of the group). The method of FIG. 8A may be performed after the methods of FIGS. 7A-7D are performed with the first one in the group of subscribers.

Beginning at a start block 802 of FIG. 8A, an AMF entity may receive, from a user equipment (UE), a request for registration (step 804 of FIG. 8A). The request for registration may include a subscriber identifier. The request for registration may further include the group identifier or, more specifically, the NSSAI which includes the group identifier. The AMF entity may identify, with use of the group identifier, an existing group context stored in association with the group identifier at the AMF entity (step 806 of FIG. 8A). The AMF entity may obtain the access policies from the identified group context (step 808 of FIG. 8A). Recall that the obtained access policies were previously obtained by the AMF entity via the PCF entity in response to a first registration of a first subscriber of the group of subscribers (step 808 of FIG. 8). See e.g. steps 714 and 716 of FIG. 7B. The AMF entity may send, to the UE, an acceptance to the request for registration, where the acceptance includes the obtained group policies (step 812 of FIG. 8A). Note that the group identifier in this method may be encoded and communicated in network slice selection assistance information (NSSAI) associated with the UE. The method may continue through a connector A to the method of FIG. 8B, described below.

Figure 8B:
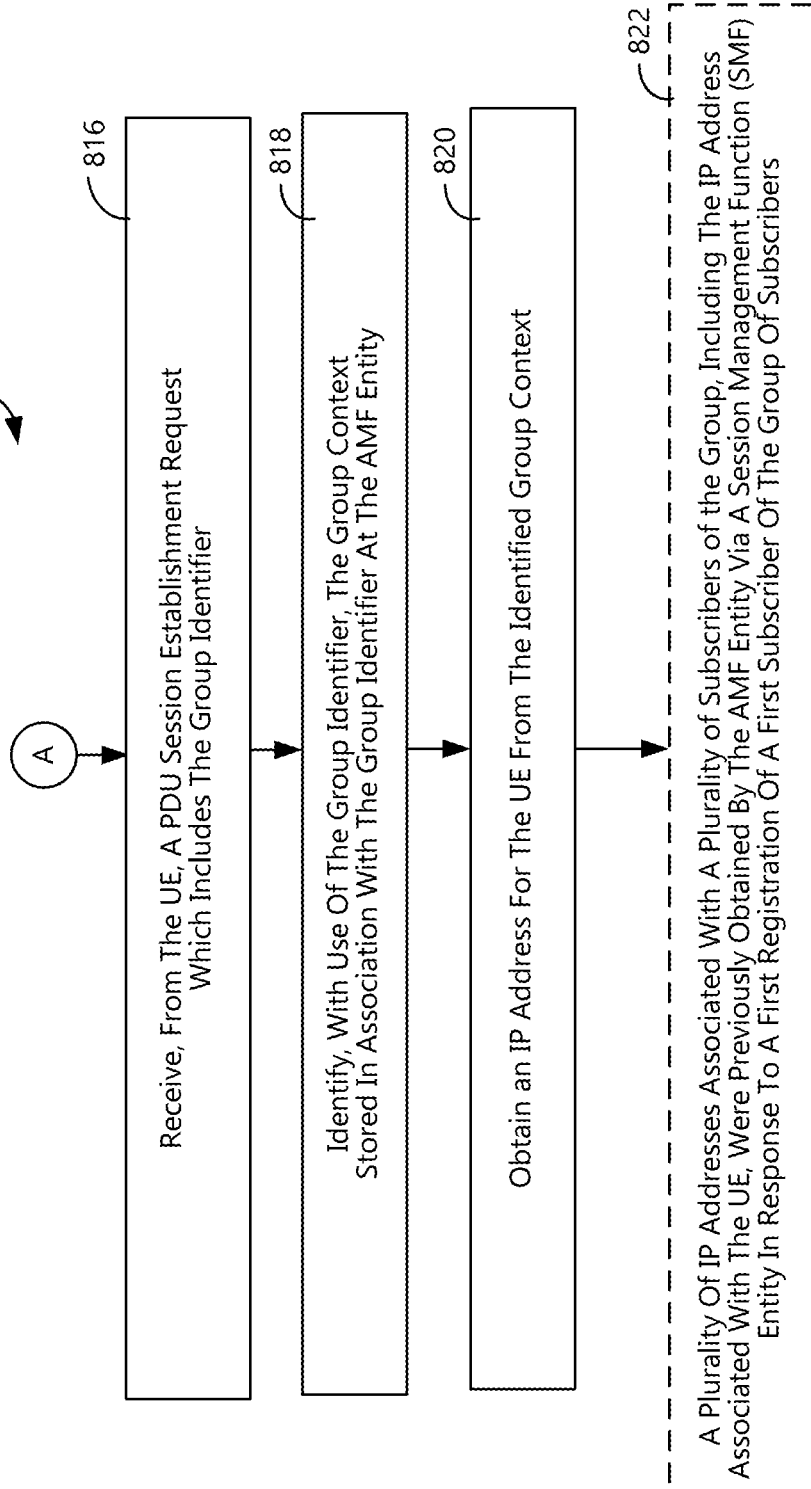

FIG. 8B is a flowchart 800b for describing a method for use in establishing a group session for subscribers associated with a group according to some implementations of the present disclosure. The method of FIG. 8B may be performed by a network entity or device in a mobile network, such as AMF entity in a 5G mobile network. FIG. 8A may relate to processing of any subsequent one of the group of subscribers, subsequent to the first one of the subscribers of the group (e.g. for any subsequently-registering subscriber of the group). The method of FIG. 8B may be performed after the methods of FIGS. 7A-7D are performed with the first one in the group of subscribers. The method of FIG. 8B may be a separate method, or a continuation of the method of FIG. 8A via the connector A.

To begin in FIG. 8B, the AMF entity receives, from the UE, a PDU session establishment request which includes the group identifier (step 816 of FIG. 8B). The AMF identifies, with use of the group identifier, an existing group context stored in association with the group identifier at the AMF entity (step 818 of FIG. 8B). The AMF entity obtains an IP address for the UE from the identified group context (step 820 of FIG. 8B). Recall that a plurality of IP addresses associated with a plurality of subscribers identifiers, including the IP address associated with the UE, were previously obtained by the AMF entity via a session management function (SMF) entity in response to a first PDU establishment request of the first subscriber of the group of subscribers (step 822 of FIG. 8B). See e.g. steps 730 and 732 of FIG. 7D. Note that the group identifier in this method may be encoded and communicated in network slice selection assistance information (NSSAI) associated with the UE.

FIG. 9 is a flowchart 900 for describing a method for use in establishing a group session for subscribers associated with a group according to some implementations of the present disclosure. The method of FIG. 9 may be performed by a network entity or device in a mobile network, such as an SMF entity in a 5G mobile network. FIG. 9 may relate to processing of the first one of the group of subscribers (e.g. for the first-registered or first-session-establishing subscriber of the group).

Beginning at a start block 902 of FIG. 9, the SMF entity may receive, from an AMF entity, a session management request associated with a PDU session establishment request from a user equipment (UE) (step 904 of FIG. 9). The session management request may include a group identifier. The SMF entity may send, to a policy and charging function (PCF) entity, a corresponding PDU session establishment request which includes the group identifier (step 906 of FIG. 9). The SMF entity may receive, from the PCF entity, a response to the corresponding PDU session establishment request, where the response includes the plurality of subscriber identifiers associated with the group identifier (step 908 of FIG. 9). The SMF entity may assign a set of IP addresses to a plurality of subscriber identifiers associated with the group identifier (step 910 of FIG. 9). The SMF entity may send, to the AMF, a session management response to the session management request, where the response includes the plurality of IP address in association with the plurality of subscriber identifiers (step 912 of FIG. 9). Note that the group identifier in this method may be encoded and communicated in network slice selection assistance information (NSSAI) associated with the UE. The method ends at a finish block 914 of FIG. 9.

Figure 10:
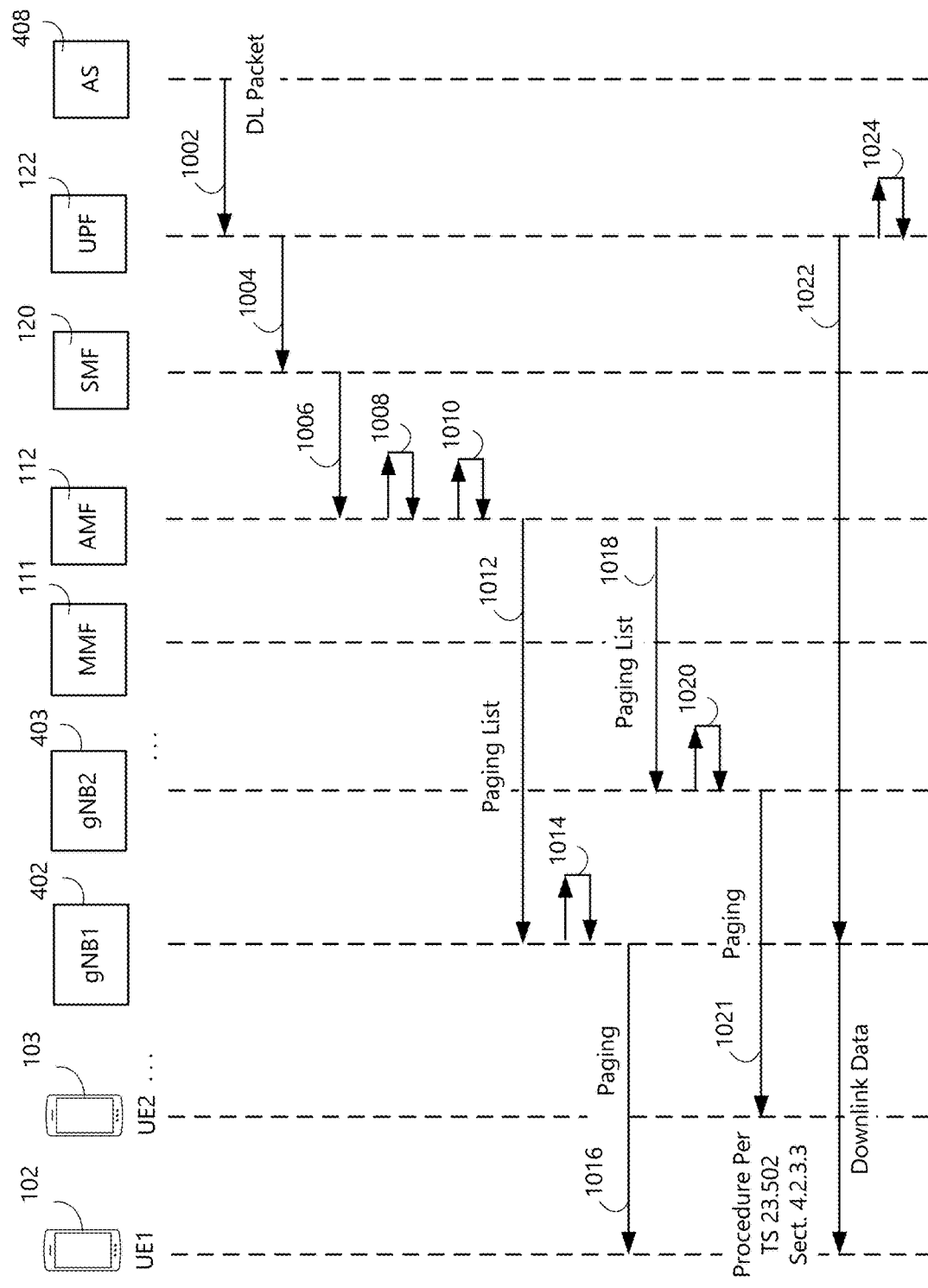
FIG. 10 is a message flow diagram for describing a method for use in communicating mobile-terminating data to a plurality of subscribers of a group according to some implementations of the present disclosure.

FIG. 10 is a message flow diagram 1000 for describing a method for use in communicating mobile-terminating data to a plurality of subscribers of a group according to some implementations of the present disclosure. The mobile-terminating data may be any suitable data that needs to be sent to the entire group of subscriber/UEs.

In FIG. 10, one or more data packets for the communication of data to a group of subscribers of UEs may be sent from AS 408 to UPF 122 (step 1002 of FIG. 10). In response, UPF 122 may send to SMF 120 a message which includes a data notification for communicating the data (step 1004 of FIG. 10). The message may include a group identifier associated with the group of subscribers. In response, SMF 120 may send to AMF 112 a message indicating the data notification for communicating the data (step 1006 of FIG. 6). Again, the message may include the group identifier.

In response, AMF 112 may obtain a list of subscriber identifiers for UEs associated with the group identifier. The AMF 112 may then determine a list of one or more base stations (i.e. gNBs) currently serving the UEs associated with the obtained list of subscriber identifiers of the group (step 1008 of FIG. 10). The AMF 112 may create a list of UEs served by each one of the one or more base stations (step 1010 of FIG. 10). For each base station, AMF 112 may send to the base station a paging list of UEs to page. For example, AMF 112 may send to gNB 402 a first paging list of UEs to page (step 1012 of FIG. 10) which results in gNB 402 paging each UE in the list (step 1014 of FIG. 10) through one or more paging messages (1016 of FIG. 10). Similarly, for example, AMF 112 may send to gNB 403 a second paging list of UEs to page (step 1018 of FIG. 10) which results in gNB 403 paging each UE in the list (step 1020 of FIG. 10) through one or more paging messages (step 1021 of FIG. 10).

As a UE responds to the paging, a UE service request procedure may be performed for the UE. The UE service request procedure may be, for example, the procedure provided in TS 23.502, section 4.2.3.3. As a result, downlink data may be communicated from AS 408 to UE 102 via UPF 122 (step 1022 of FIG. 10). The process is repeated for each UE responding to the paging (e.g. UE 103) (step 1024 of FIG. 10).

Figure 11:
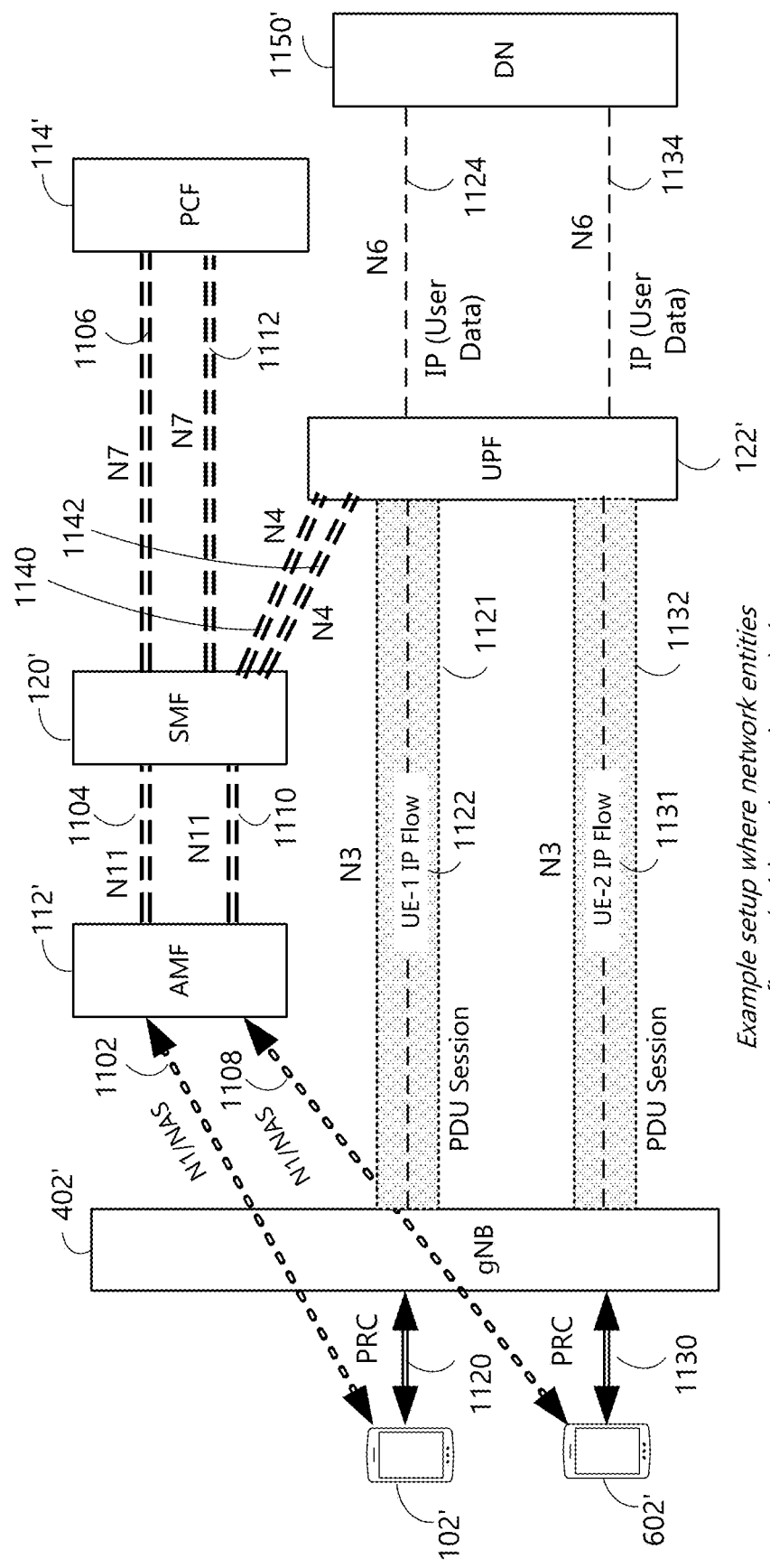
FIG. 11 is an illustrative representation of session establishment made for two UEs in the mobile network, where entities of the mobile network of FIGS. 1A-1B are not configured with techniques of the present disclosure described in relation to FIGS. 2-10.

FIG. 11 is an illustrative diagram 1100 of session establishment made for two or more UEs where entities of the mobile network of FIGS. 1A-1B are not configured with techniques of the present disclosure described in relation to FIGS. 2-10. Note that, in FIG. 11, the reference numbers include apostrophes for indicating the same entities, devices, functions, or equipment as described above but without incorporation of any of the techniques of the present disclosure.

In FIG. 11, UE 102' communicates with the mobile network for establishing a data session for communicating data. In particular, UE 102' communicates with AMF 112' via gNB 402 with a communication signaling (i.e. NAS signaling) 1102 over the N1 interface. AMF 112' communicates with SMF 120' in a session 1104 over the N11 interface, SMF 120' communicates with PCF 114' in a session 1106 over the N7 interface and with UPF 122' in a session 1140 over the N4 interface. A radio bearer 1120 is established between UE 102' and gNB 402'. Data packets of an IP traffic flow 1122 for UE 102' are communicated in a PDU session 11211 between gNB 402' and UPF 122' via the N3 interface. The data packets/user data 1124 are communicated between UPF 122' and a data network (DN) 1150'.

Similarly in FIG. 11, UE 602' communicates with the mobile network for establishing a data session for communicating data. In particular, UE 602' communicates with AMF 112' via gNB 402 with a communication signaling (i.e. NAS signaling) 1108 over the N1 interface. AMF 112' communicates with SMF 120' in a session 1110 over the N11 interface, SMF 120' communicates with PCF 114' in a session 1112 over the N7 interface and with UPF 122' in a session 1132 over the N4 interface. A radio bearer 1130 is established between UE 602' and gNB 402'. Data packets of an IP traffic flow 1131 for UE 602' are communicated in a PDU session 1132 between gNB 402' and UPF 122' via the N3 interface. The data packets/user data 1134 are communicated between UPF 122' and DN 1150'.

Figure 12:
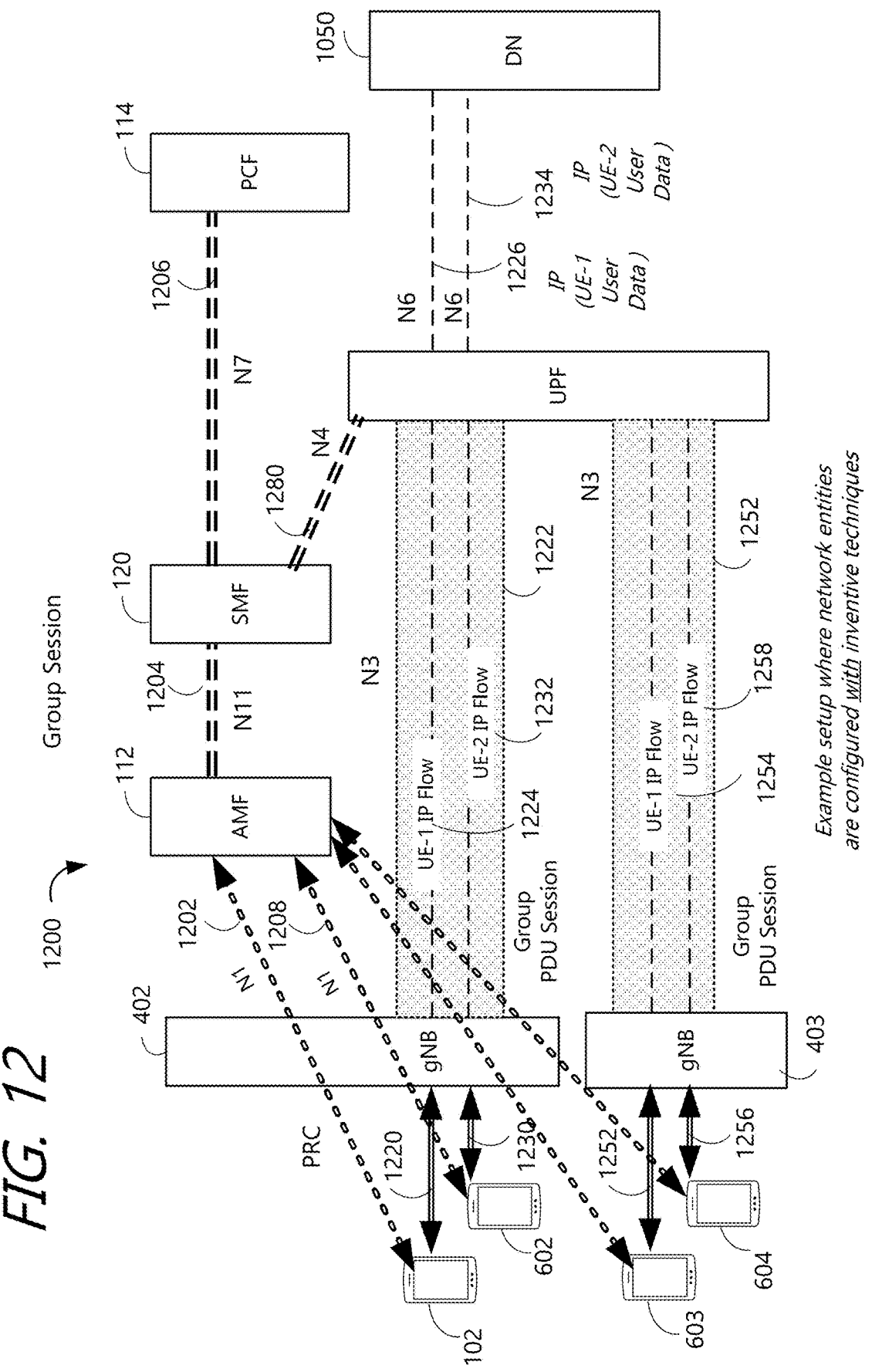
FIG. 12 is an illustrative representation of session establishment made for two or more UEs in the mobile network, where the UEs are members of a group, established in accordance with techniques of the present disclosure described in relation to FIGS. 2-10.

FIG. 12 is an illustrative diagram 1200 of session establishment made for two or more UEs of a group, established in accordance with techniques of the present disclosure described in relation to FIGS. 2-10, provided especially for comparison with FIG. 11.

In FIG. 12, UE 102 communicates with the mobile network for session establishment for the communication of data. UE 102 is a member of a group of subscribers for group processing by the mobile network. In particular, UE 102 communicates with AMF 112 via gNB 402 with a communication signaling (i.e. NAS signaling) 1202 over the N1 interface. AMF 112 communicates with SMF 120 in a group session 1204 over the N11 interface, SMF 120 communicates with PCF 114 in a group session 1206 over the N7 interface and with UPF 122 in a group session 1280 over the N4 interface. A radio bearer 1220 is established between UE 102 and gNB 402. Data packets of an IP traffic flow 1224 for UE 102 are communicated in a PDU group session 1222 between gNB 402 and UPF 12 via the N3 interface. The data packets/user data 1226 are communicated between UPF 122 and the DN 1150.

Similarly in FIG. 12, an additional UE 602 of the group communicates with the mobile network for the communication of data. In particular, UE 602 communicates with AMF 112 via gNB 402 with a communication signaling (i.e. NAS signaling) 1208 over the N1 interface. Here, AMF 112 communicates with SMF 120 over the N11 interface for UE 602 in the same group session 1206, SMF 120 communicates with PCF 114 over the N7 interface for UE 602 using the group session 1206, and SMF 120 communicates with UPF 122 over the N4 interface for UE 602 using the same group session 1280. A radio bearer 1230 is established between UE 602 and gNB 402. Data packets of an IP traffic flow 1232 for UE 602 are communicated in the same PDU group session 1222 between gNB 402 and UPF 122 via the N3 interface. The data packets/user data 1234 are communicated between UPF 122 and DN 1150.

Further in FIG. 12, additional UEs 603 and 604 of the group communicate with the mobile network for the communication of data. In particular, UEs 603 and 604 communicate with AMF 112 via a (different) gNB 403 with communication signaling (i.e. NAS signaling) 1140 and 1142, respectively, over the N1 interface. The NFs in the mobile network may use the same group sessions 1204, 1206, 1280 for processing these additional UEs 603 and 604. A radio bearer 1252 is established between UE 603 and gNB 403, and a radio bearer 1256 is established between UE 604 and gNB 403. Data packets of an IP traffic flow 1254 for UE 603 are communicated in a PDU group session 1252 between gNB 403 and the UPF 122 via the N3 interface, and similarly, data packets of an IP traffic flow 1258 for UE 604 are communicated in the same PDU group session 1252 between gNB 403 and the UPF 122 via the N3 interface.

Thus, in view FIG. 12, a technique according to some implementations of the present disclosure may involve maintaining a single session (e.g. a PDU session) between a base station and a UPF for IP data traffic of two or more subscribers of a plurality of subscribers of a group. Put another way, a technique according to some implementations of the present disclosure may involve establishing a session (e.g. a PDU session) between a base station and a UPF for IP data traffic of a first subscriber of a group, and including a second subscriber of the group (e.g. and subsequent subscribers in the group) in the session between a base station and the UPF for IP data traffic of the second subscriber (e.g. and subsequent subscribers in the group).

Similarly, a technique according to some implementations of the present disclosure may involve maintaining a single session or signaling communication between NFs (e.g. between AMF and SMF, between SMF and PCF, and/or between SMF and UPF) for two or more subscribers of a plurality of subscribers of a group. Put another way, a technique according to some implementations of the present disclosure may involve establishing a session or communication signaling between NFs for managing IP data traffic of a first subscriber of a group, and including a second subscriber of the group (e.g. and subsequent subscribers in the group) in the same session or communication signaling between the NFs for managing IP data traffic of the second subscriber (e.g. and subsequent subscribers in the group).

In some alternative implementations of the techniques of FIGS. 2-12, the subscriber identifier is used to identify (at least the initial) association between the subscriber and the group instead of the group identifier.

Figure 13:
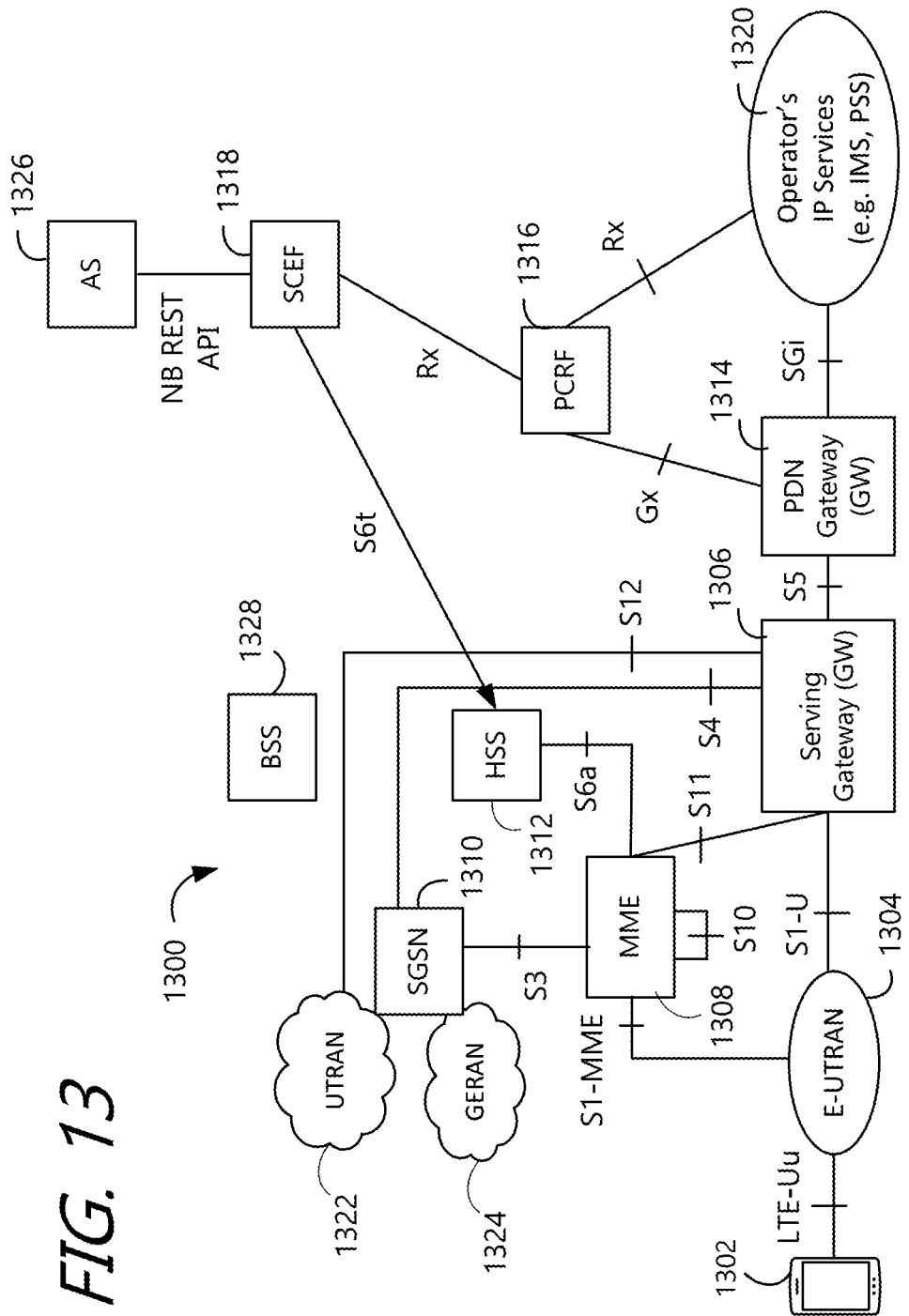
FIG. 13 is an illustrative representation of a basic network architecture 1300 of a (4G) Long Term Evolution (LTE)-based mobile network.

FIG. 13 is an illustrative representation of a basic network architecture 1300 of a (4G) Long Term Evolution (LTE)-based mobile network. Network architecture 1300 of the LTE-based network of FIG. 13 includes a mobility management entity (MME) 1308, a serving GPRS support node (SGSN) 1310, a home subscriber server (HSS) 1312, a service capability exposure function (SCEF) 1318, a policy and charging rules function (PCRF) 1316, a serving gateway (GW) 1306, and a packet data network (PDN) gateway 1314. A business support system (BSS) 1328 may also be connected to the network. A plurality of interfaces shown in network architecture 130 of FIG. 13 (e.g. LTE-Uu, S1-U, S1-MME, S3, S4, S5, S6a, S10, S11, S12, Gx, Rx, SGi, S6t, an NB REpresentational State Transfer (REST) Application Programming Interface (API)) may define the communications and/or protocols between each of the entities, as described in the relevant standards documents for LTE. An operator may provide an IP service network 1320 with connection to the network via PCRF 1316 and PDN gateway 1314. The IP service network 1320 may provide IP services such as IP multimedia subsystem (IMS), packet switched stream (PSS), etc. An application server (AS) 1326 may connect to the mobile network via SCEF 1318.

A user equipment (UE) 1302 may obtain access to the mobile network via a Universal Terrestrial Radio Access Network (eUTRAN) which may include one or more base stations (eNodeBs or eNBs) and one or more radio network controllers (RNCs). In the present disclosure, the UEs operating in the LTE-based mobile network may be any suitable type of devices, such as cellular telephones, smart phones, tablet devices, Internet of Things (IoT) devices, and machine-to-machine (M2M) communication devices, to name but a few. For additional network access for UEs, one or more additional UTRANs 1322 and one or more GSM edge radio access networks (GERAN) 1324 may be connected in the network.

Figure 14:
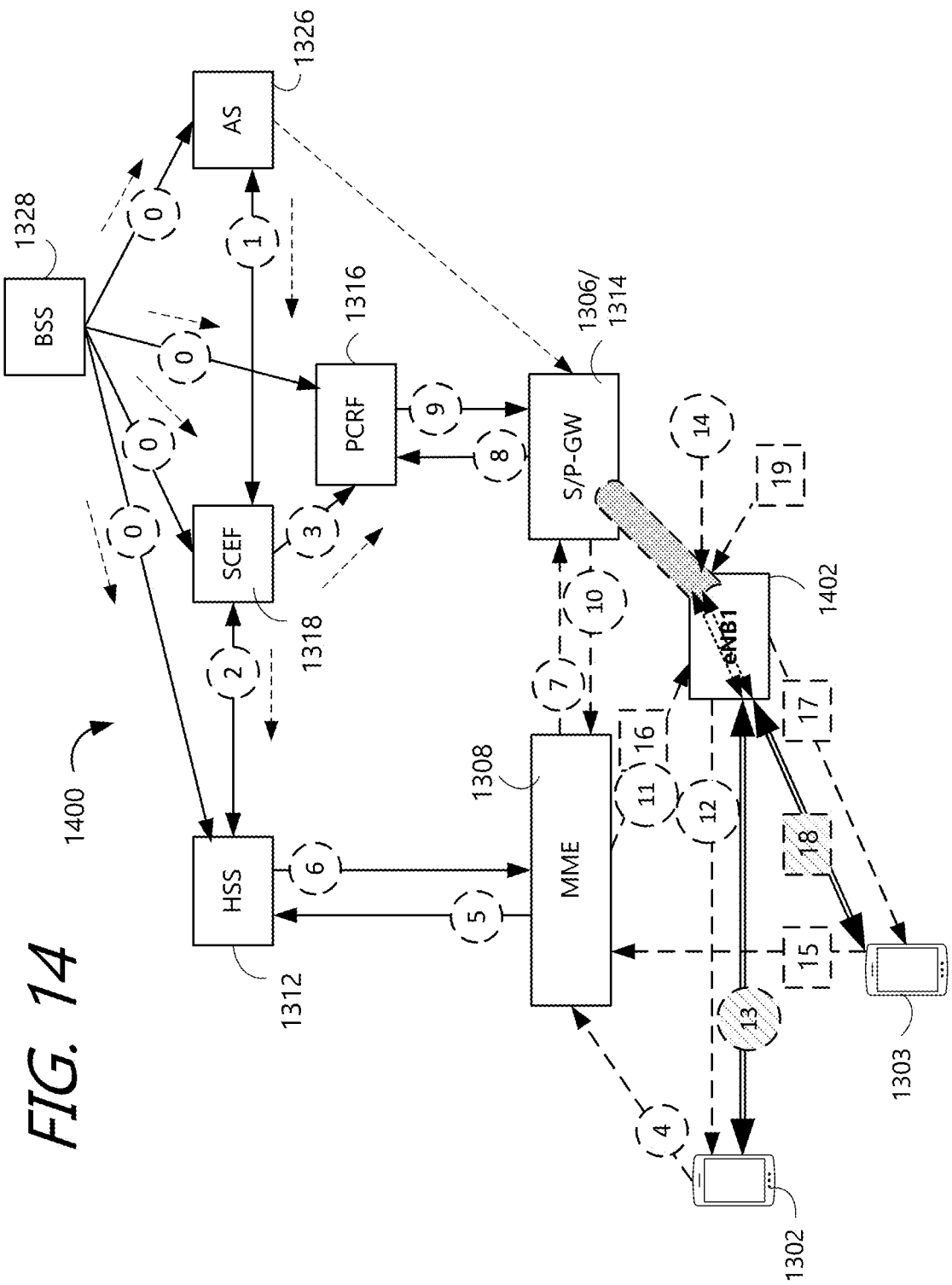
FIG. 14 is a process flow diagram for describing a method for use in establishing a group session for subscribers associated with a group in the LTE-based mobile network of FIG. 13.

FIG. 14 is a process flow diagram 1400 for describing a method for use in establishing a group session for subscribers associated with a group in the mobile network of FIG. 13 according to some implementations of the present disclosure. Here, the entities, functions, and interfaces of the LTE mobile network represented in FIGS. 13-14 may be configured in accordance with the relevant LTE-based standards, with modification, adaptation, and/or additions provided in accordance with the techniques of the present disclosure. The method of FIG. 14 may be especially suitable in situations where a relatively large number of devices (e.g. IoT devices) are deployed and have the same or similar communication needs.

The mobile network of FIG. 13 may be configured for establishing a group session for subscribers associated with a group (i.e. for those subscribers that are provisioned for a group and/or group processing). The processing of subscribers of a group in the mobile network may be provided in addition to the processing of subscribers individually as is conventional. From the perspective of the mobile network operator, the processing of subscribers of a group in accordance with some implementations of the present disclosure may provide for a reduced signaling load in the mobile network, and/or a more simplified and efficient management and control over the subscribers. From the perspective of the owner or controller of the UEs/subscribers of a group, the processing of subscribers of a group in accordance with some implementations of the present disclosure may provide for a more simplified and efficient management and oversight over the subscribers, as well as provide a better understanding of the (combined) actual, communication needs for the subscriber group.

Each group of subscribers may be associated with a (unique) group identifier. A plurality of identifiers of subscribers/UEs that are members of the group may be stored in association with the group identifier associated with the group (e.g. in memory or a DB). In some implementations, one or more policies or policy rules for the group may also be stored in association with the group identifier of the group. The one or more policies or policy rules stored in associated with the group identifier may indicate one or more parameters for control and management of the group. The one or more policies may indicate, for example, one or more quality of service (QoS) parameters for the group, and/or a total bandwidth (e.g. uplink/downlink bandwidth) of the group. More generally, the one or more polices may indicate one or more parameters that provide an assurance on the level or extent of communications of the group, and/or one or more parameters that provide a limitation or restriction on the level or extent of communications of the group.

With reference now to the process flow in FIG. 14, a provisioning system, such as BSS 1328, may provision one or more groups of subscribers at each one of a plurality of network entities of the mobile network (process step "0" of FIG. 14). More particularly, BSS 1328 may provision the HSS 132, the SCEF 1318, and the AS 1326 with one or more groups of subscribers. For example, the network entities may be provisioned with a group identifier and its associated plurality or list of subscriber identifiers of subscribers/UEs that are members of the group. Once a group is provisioned, the group may be referenced by the group identifier over the S6a, S11, S8, and Gx interfaces, as well as the Northbound REST interface between SCEF 1318 and the AF. AS 1326 may initiate activation procedures of the group that is provisioned in the network (process step "1" in FIG. 14). In turn, SCEF 1318 may activate the group in HSS 1312 (process step "2" in FIG. 14) ad PCRF 1316 (process step "3" in FIG. 14).

Sometime after group provisioning and activation in the network, UE 1302 associated with a subscriber of the group may perform an attach to the mobile network (process step "4" in FIG. 14). The performing of the attach may alternatively be referred to performing a registration with a registration message. The attach includes a subscriber identifier (e.g. IMSI). In response, MME 1308 may request profile and/or subscription data of UE 1302 from HSS 1312, per existing procedures (process step "5" in FIG. 14). Process step "5" may include communicating a message which includes a location update with the subscriber identifier (e.g. IMSI). In response, MME 1308 may receive from HSS 1312 the group identifier associated with the group and its associated plurality of subscriber identifiers (process step "6" in FIG. 14).

MME 1308 may then initiate the creation a group session for the subscriber/group of subscribers by communicating with S/P GW 1306/1314 (process step "7" in FIG. 14). In turn, P-GW 1314 may initiate a Gx group session establishment which includes the group identifier (process step "8" in FIG. 14). The Gx group session establishment may be performed with PCRF 1316. In response, PCRF 1316 may respond to P-GW 1314 with the list of subscriber identities of the group, as well as policy and charging control (PCC) rules associated with the group (process step "9" in FIG. 14).

In response, S/P GW 1306/1314 may assign a set of IP addresses to the subscriber identifiers (e.g. IMSIs) in the list and send this information to MME 1308 (process step "10"

in FIG. 14). That is, each IP address of the set is assigned to (or for assignment to) a respective one of the plurality of subscriber identifiers of the group. This step may be performed by sending the list to MME 1308 using Protocol Configuration Options (PCO). The communication to MME 1308 may include an identifier, such as a tunnel endpoint identifier (TEID), which is assigned to a user plane for the group session. MME 1308 may retrieve or obtain the IP address associated with the subscriber identifier (e.g. IMSI) from the previous UE attach (i.e. process step "4"), and send to eNB 1402 an initial context setup message that includes the NAS message for UE 1302 and the TEID for the selected user plane (process step "11" in FIG. 14). eNB 1402 may return a NAS message indicating an attach accept, which includes an identifier of a bearer (i.e. an EPS bearer) and the assigned IP address for UE 1302 (process step "12" in FIG. 14). UE 1302 may begin sending data packets to eNB 1402 (process step "13" in FIG. 14), and eNB 1402 maps the data packets into a GPRS tunneling protocol (GTP-U) tunnel per the TEID received in process step "10" (process step "14" in FIG. 14).

An additional UE 1303 associated with another subscriber of the group may subsequently perform an attach to the mobile network (process step "15" in FIG. 14). The attach may include a subscriber identifier (e.g. IMSI) of the subscriber. Notably, process steps 5-10 for this additional UE 1303 need not be performed. Rather, MME 1308 may identify that UE 1303 is associated with the group based on its subscriber identifier (process step "16" in FIG. 14). MME 1308 may retrieve or obtain the IP address associated with the subscriber identifier (e.g. IMSI) from the UE attach (i.e. process step "15"), and send to eNB 1402 an initial context setup message that includes the NAS message for UE 1303 and the TEID for the selected user plane (process step "16" in FIG. 14). eNB 1402 may return a NAS message indicating an attach accept, which includes an identifier of a bearer (i.e. an EPS bearer) and the assigned IP address for UE 1303 (process step "17" in FIG. 14). UE 1303 may begin sending data packets to eNB 1402 (process step "18" in FIG. 14), and eNB 1402 maps the data packets into the GTP-U tunnel per the TEID previously received in process step "10" (process step "14" in FIG. 14).

Figure 15:
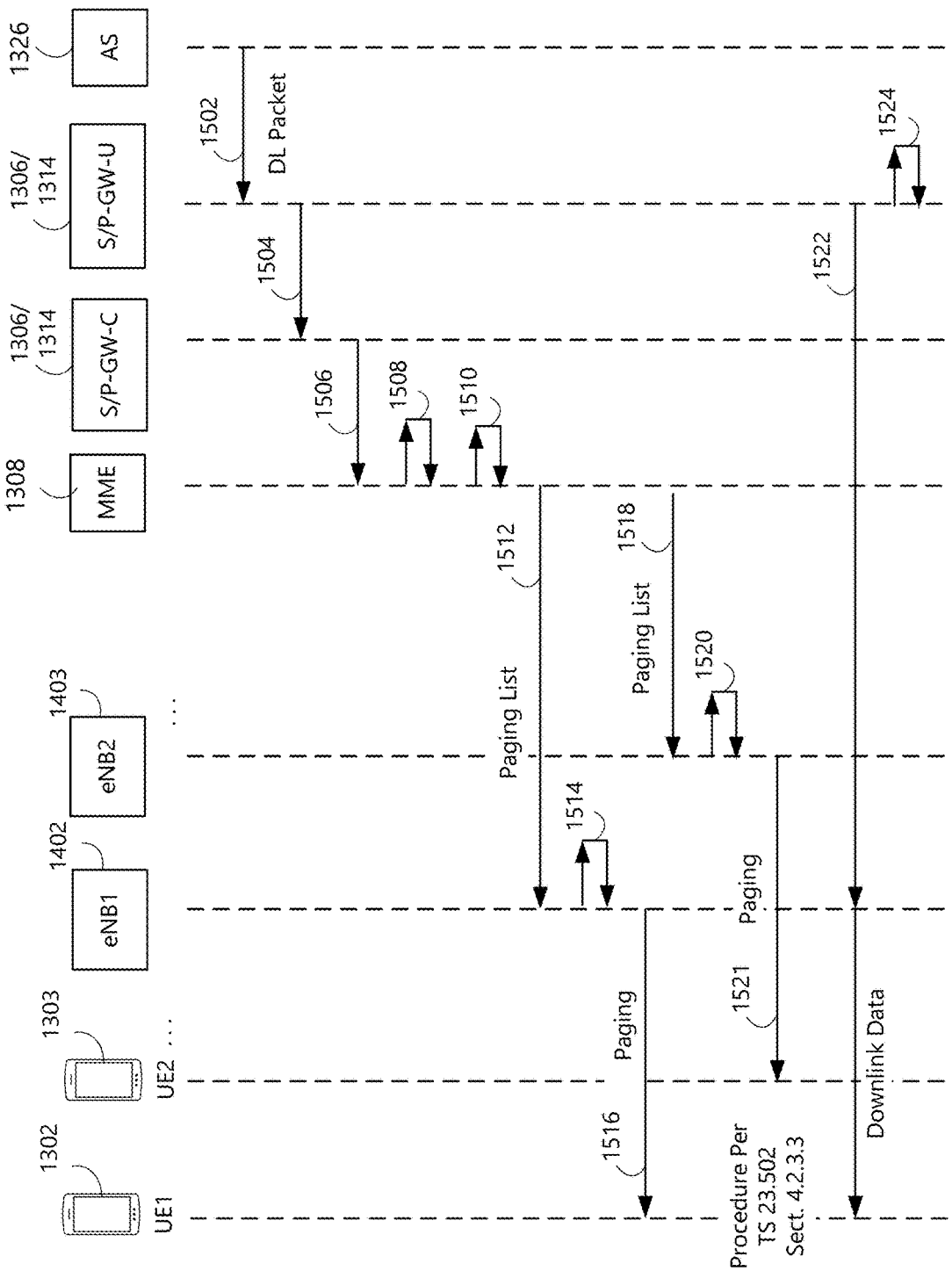
FIG. 15 is a message flow diagram 1500 for describing a method for use in communicating mobile-terminating data to a plurality of subscribers of a group in the LTE-based mobile network described in relation to FIGS. 13-14.

FIG. 15 is a message flow diagram 1500 for describing a method for use in communicating mobile-terminating data to a plurality of subscribers of a group in the mobile network described in relation to FIGS. 13-14. The mobile-terminating data may be any suitable data that needs to be sent to the entire group of subscriber/UEs.

In FIG. 15, one or more data packets for the communication of data to a group of subscribers of UEs may be sent from AS 408 to S/P-GW-U (User Plane) 1306/1314 (step 1502 of FIG. 15). In response, S/P-GW-U 1306/1315 may send to S/P-GW-C(Control Plane) 1306/1314 a message which includes a data notification for communicating the data (step 1504 of FIG. 15). The message may include a group identifier associated with the group of subscribers. In response, S/P-GW-C 1306/1314 may send to MME 1308 a message indicating the data notification for communicating the data (step 1506 of FIG. 15). Again, the message may include the group identifier.

In response, MME 1308 may obtain a list of subscriber identifiers for UEs associated with the group identifier. The MME 1308 may then determine a list of one or more base stations (i.e. eNBs) currently serving the UEs associated with the obtained list of subscriber identifiers of the group (step 1508 of FIG. 15). The MME 1308 may then create a list of UEs served by each one of the one or more base stations (step 1510 of FIG. 15). For each base station, MME 1308 may send to the base station a paging list of UEs to page. For example, MME 1308 may send to eNB 1402 a first paging list of UEs to page (step 1512 of FIG. 15) which results in eNB 1402 paging each UE in the list (step 1514 of FIG. 15) through one or more paging messages (1516 of FIG. 15). Similarly, for example, MME 1308 may send to eNB 1403 a second paging list of UEs to page (step 1518 of FIG. 15) which results in eNB 1403 paging each UE in the list (step 1520 of FIG. 15) through one or more paging messages.

As a UE responds to the paging, a UE service request procedure is performed for the UE. The UE service request procedure may be, for example, the procedure provided in TS 23.502, section 4.2.3.3. As a result, downlink data is communicated from S/P-GW-U 1306/1314 to UE 102 (step 1522 of FIG. 15). The process is repeated for each UE responding to the paging (e.g. UE 103) (step 1524 of FIG. 15).

Figure 16:
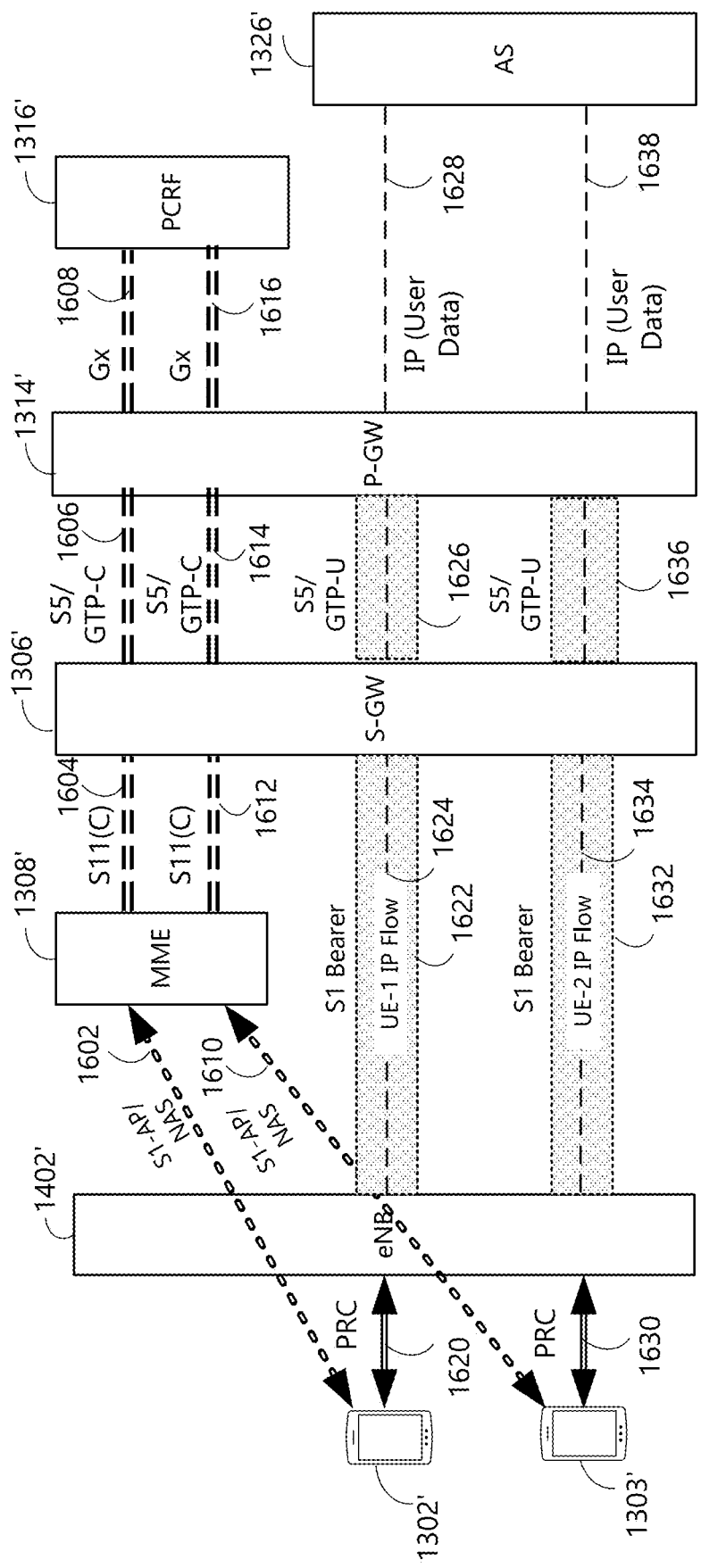
FIG. 16 is an illustrative representation of session establishment made for two or more UEs where entities of the mobile network of FIG. 13 are not configured with techniques of the present disclosure described in relation to FIGS. 14-16.

FIG. 16 is an illustrative diagram 1600 of session establishment made for two or more UEs where entities of the mobile network of FIG. 13 are not configured with techniques of the present disclosure described in relation to FIGS. 14-16. Note that, in FIG. 16, the reference numbers include apostrophes for indicating the same entities, devices, functions, or equipment as described above but without incorporation of any of the techniques of the present disclosure.

In FIG. 16, UE 1302' communicates with the mobile network for session establishment for the communication of data. In particular, UE 1302' communicates with MME 1308' via eNB 1402' with a communication signaling (i.e. NAS signaling) 1602 over the S1/AP interface. MME 1308' communicates with S-GW 1306' in a session 1604 over the S11(C) interface, S-GW 1306' communicates with P-GW 1314' in a session 1606 over the S5/GTP-C interface, and P-GW 1314' communicates with PCRF 1316' in a session 1608 over the Gx interface. A radio bearer 1620 is established between UE 1302' and eNB 1402'. Data packets of an IP traffic flow 1624 for UE 1302' are communicated over a bearer 1622 (i.e. an S1 bearer) established between eNB 1402' and S-GW 1306' via the S1-U interface, and communicated over a bearer 1626 (i.e. an S5 bearer) between S-GW 1306' and P-GW 1314' via the S5/GTP-U interface. The data packets/user data 1628 are communicated between P-GW 1314' and AS 1326'.

Similarly in FIG. 16, UE 1303' communicates with the mobile network for session establishment for the communication of data. In particular, UE 1303' communicates with MME 1308' via eNB 1402' with a communication signaling (i.e. NAS signaling) 1610 over the S1/AP interface. MME 1308' communicates with S-GW 1306' in a session 1612 over the S11(C) interface, S-GW 1306' communicates with P-GW 1314' in a session 1614 over the S5/GTP-C interface, and P-GW 1314' communicates with PCRF 1316' in a session 1616 over the Gx interface. A radio bearer 1630 is established between UE 1303' and eNB 1402'. Data packets of an IP traffic flow 1634 for UE 1303' are communicated over a bearer 1632 (i.e. an S1 bearer) established between eNB 1402' and S-GW 1306' via the S1-U interface, and communicated over a bearer 1636 (i.e. an S5 bearer) between S-GW 1306' and P-GW 1314' via the S5/GTP-U interface. The data packets/user data 1638 are communicated between P-GW 1314' and AS 1326'.

Figure 17:
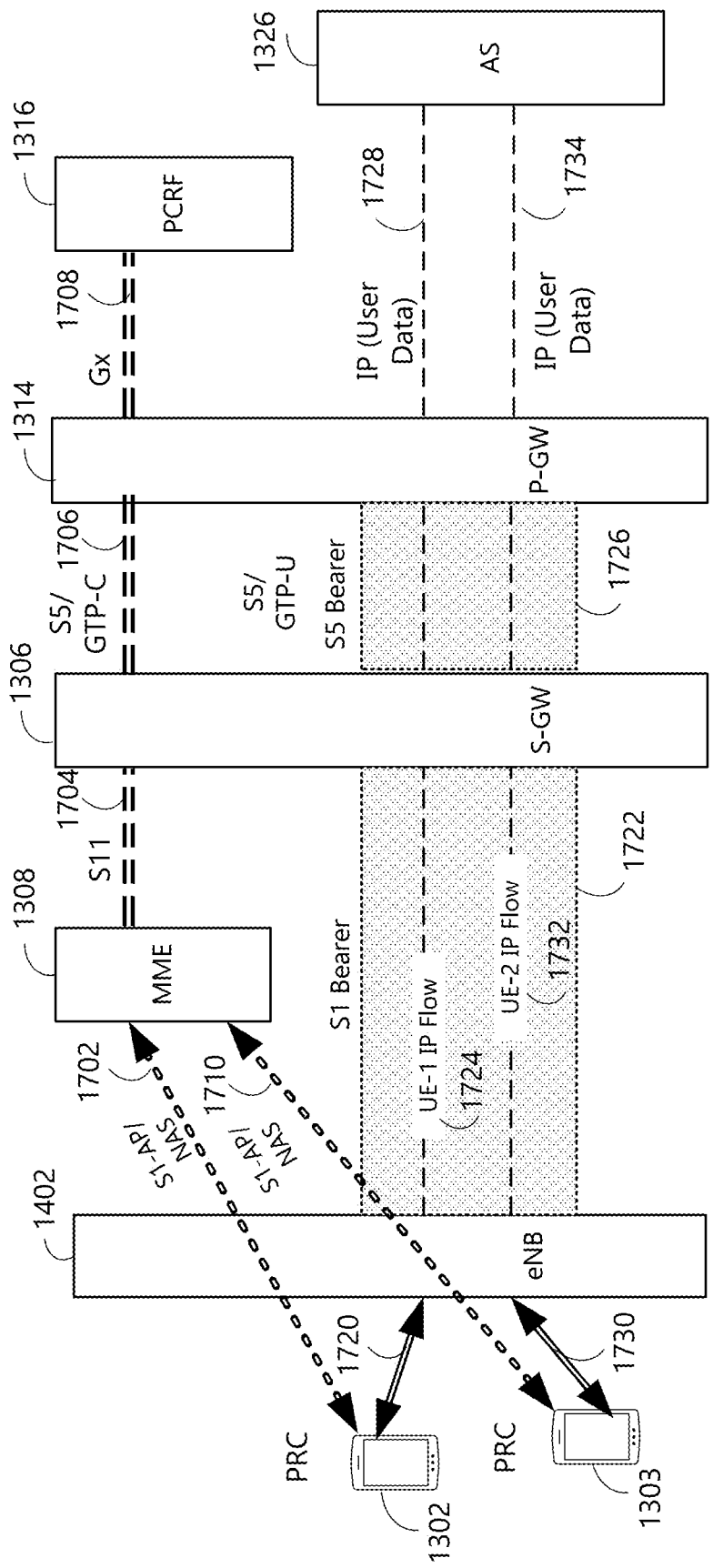
FIG. 17 is an illustrative example of session establishment made for two or more UEs of a group, established in accordance with techniques of the present disclosure described in relation to FIGS. 14-15.

FIG. 17 is an illustrative diagram 1700 of session establishment made for two or more UEs of a group, established in accordance with techniques of the present disclosure described in relation to FIGS. 14-15, provided especially for comparison with FIG. 11.

In FIG. 17, UE 1302 communicates with the mobile network for session establishment for the communication of data. UE 1302 is a member of a group of subscribers for group processing by the mobile network. In particular, UE 1302 communicates with MME 1308 via eNB 1402 with a communication signaling (i.e. NAS signaling) 1702 over the S1/AP interface. MME 1308 communicates with S-GW 1306 for UE 1302 over the S11 interface in a group session 1704, S-GW 1306 communicates with P-GW 1314 for UE 1302 over the S5/GTP-C interface in a group session 1706, and P-GW 1314 communicates with PCRF 1316 for UE 1302 over the Gx interface in a group session 1708. A radio bearer 1720 is established between UE 1302 and eNB 1402. Data packets of an IP traffic flow 1724 for UE 1302 are communicated over a bearer 1722 (i.e. an S1 bearer) established between eNB 1402 and S-GW 1306 via the S1-U interface, and communicated over a bearer 1726 (i.e. an S5 bearer) between S-GW 1306 and P-GW 1314 via the S5/GTP-U interface. The data packets/user data 1728 are communicated between P-GW 1314 and AS 1326.

Similarly in FIG. 17, an additional UE 1303 of the group communicates with the mobile network for the communication of data. In particular, UE 1302 communicates with MME 1308 via eNB 1402 with a communication signaling (i.e. NAS signaling) 1710 over the S1/AP interface. MME 1308 communicates with S-GW 1306 over the S11 interface for UE 1303 in the same group session 1704, S-GW 1306 communicates with P-GW 1314 over the S5/GTP-C interface for UE 1303 in the same group session 1706, and P-GW 1314 communicates with PCRF 1316 over the Gx interface for UE 1303 in the sa,e group session 1708. A radio bearer 1730 is established between UE 1302 and eNB 1402. Data packets of an IP traffic flow 1732 for UE 1303 are communicated over the same bearer 1722 (i.e. the S1 bearer) established between eNB 1402 and S-GW 1306 via the S1-U interface, and communicated over the same bearer 1726 (i.e. the S5 bearer) established between S-GW 1306 and P-GW 1314 via the S5/GTP-U interface. The data packets/user data 1734 are communicated between P-GW 1314 and AS 1326.

Thus, in view FIG. 17, a technique according to some implementations of the present disclosure may involve maintaining a single bearer (e.g. an S1 bearer) between a base station and a gateway for IP data traffic of two or more subscribers of a plurality of subscribers of a group. Put another way, a technique according to some implementations of the present disclosure may involve establishing a bearer (e.g. an S1 bearer) between a base station and a gateway for IP data traffic of a first subscriber of a group, and including IP data traffic of a second subscriber of the group (e.g. and subsequent subscribers in the group) over the same bearer. The IP data traffic flow for the two or more subscribers may be established and maintained via a single tunnel (e.g. the GTP-U tunnel) from use of the same TEID (e.g. mapping the data packets to the same tunnel).

Even further, a technique according to some implementations of the present disclosure may involve maintaining a single session or signaling communication between network entities (e.g. between MME and S-GW, between S-GW and P-GW, and between P-GW and PCRF) for two or more subscribers of a plurality of subscribers of a group. Put another way, a technique according to some implementations of the present disclosure may involve establishing a session or communication signaling between the network entities for managing IP data traffic of a first subscriber of a group, and including a second subscriber of the group (e.g. and subsequent subscribers in the group) in the same session or communication signaling between the network entities for managing IP data traffic of the second subscriber (e.g. and subsequent subscribers in the group).

Figure 18:
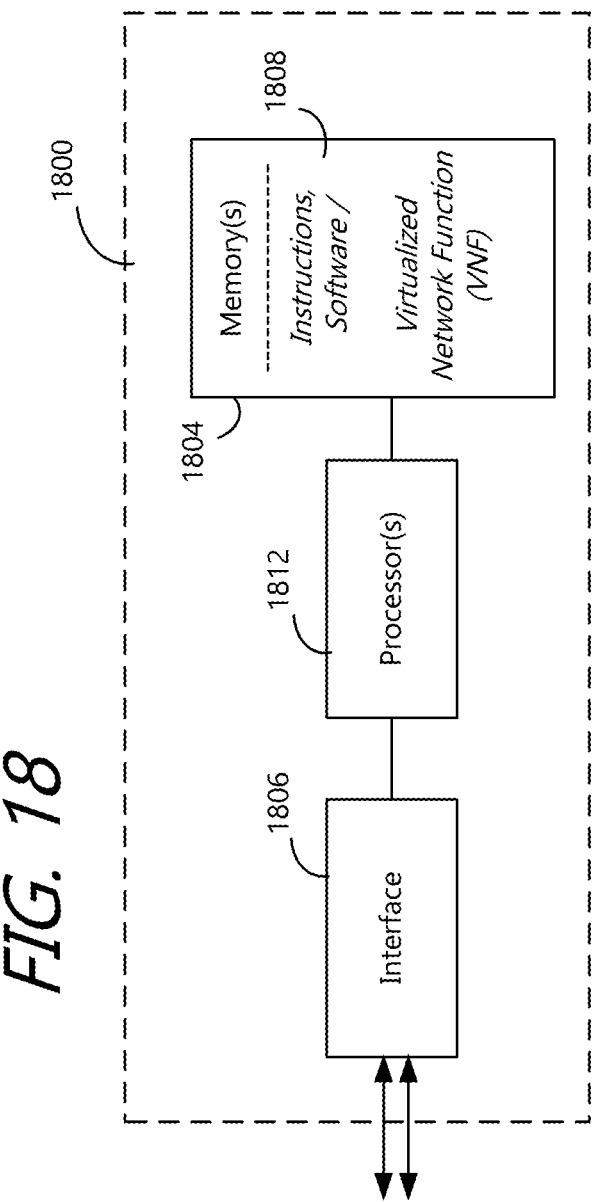
FIG. 18 is a block diagram of a server, component, or network device which may be used in some implementations of the present disclosure.

FIG. 18 is a block diagram of a server, network device or equipment 1800 which may be used in some implementations of the present disclosure. Network equipment 1800 of FIG. 18 has components which may include one or more processors 1812 which are coupled to memory 1808 and to communication interface 1806. Interface 1806 is configured to connect to one or more networks for communications. The one or more processors 1812 of the network equipment are configured to operate according to instructions 1808 stored in memory 1804, in order to perform techniques of the present disclosure as described above in relation to the Figures. The instructions may be provided as a virtual network function (VNF) or a network function virtualization (NFV) entity.

Thus, methods and apparatus for use in establishing a group session in a mobile network for subscribers of a group are described herein. In an illustrative example of techniques in a 5G mobile network, an entity such as an access and mobility management function (AMF) entity may receive, from a UE, a request for registration which may include network slice selection assistance information (NSSAI). The NSSAI may include the group identifier associated with a group of subscribers. The AMF entity may send, to a unified data management (UDM) entity, a request for subscriber data which includes the group identifier. The AMF entity may receive, from the UDM, a response to the request for subscriber data which includes the plurality of subscriber identifiers corresponding to the group. The AMF entity may create, for a group session, a group context associated with the group identifier and the plurality of subscriber identifiers, and locally store this group context. The AMF entity may obtain selected network functions (NF), selected policies or policy rules, and/or a selected set of assigned IP address for the group, and stores the information in association with the group context. For one or more remaining UEs in the group, the AMF entity may retrieve the information from the locally-stored context for use in session establishment in the group session.

In another illustrative example, an entity of a 5G mobile network such as a session management function (SMF) entity may perform a technique which involves receiving, from an access and mobility management function (AMF) entity (or other suitable entity), a session management request associated with a PDU session establishment request from a user equipment (UE), the session management request including a group identifier; assigning a plurality of IP address to a plurality of subscriber identifiers associated with the group identifier; and sending, to the AMF, a session management response to the session management request, the plurality of IP address in association with the plurality of subscriber identifiers. The technique may further involve sending, to a policy and charging function (PCF) entity, a corresponding PDU session establishment request which includes the group identifier; and receiving, from the PCF entity, a response to the corresponding PDU session establishment request, the response including the plurality of subscriber identifiers associated with the group identifier. The plurality of subscriber identifiers may be a plurality of International Mobile Subscriber Identities (IMSIs). The group identifier may be included and communicated in network slice selection assistance information (NSSAI)

associated with the UE. The group of subscribers may be associated with a plurality of Internet of Things (IoT) devices.

As another illustrative example, a technique according to some implementations of the present disclosure may involve generating or obtaining a NSSAI which includes a group identifier associated with a group of subscribers; and provisioning one or more UEs associated with one or more subscribers of the group with the NSSAI which includes the group identifier. Here, the group identifier may be provided as a slice differentiator (SD) or as information in a SD field of the NSSAI.

As yet another illustrative example, a technique according to some implementations of the present disclosure may be performed by an entity (e.g. a MME or AMF) and involve receiving, from a user equipment (UE) associated with a subscriber, a registration message for registration which includes a subscriber identifier of the subscriber; obtaining a plurality of subscriber identifiers which identify a plurality of subscribers of a group of subscribers, the group of subscribers including the subscriber and identified by a group identifier; and creating a context for a group session for the group of subscribers, the context including the group identifier and the plurality of subscriber identifiers. The context may be used for session establishment in the group session for one or more subsequent UEs associated with one or more remaining subscribers of the group. The technique may involve obtaining and storing policy data for the group session in association with the context. In addition, or alternatively, the method may involve obtaining and storing a set of IP addresses in association with the context, the set of IP addresses being respectively assigned to (or for assignment to) the plurality of subscribers of the group. In some implementations, the obtaining comprises obtaining from a home subscriber server (HSS) the plurality of subscriber identifiers which identify the plurality of subscribers of the group based on the subscriber identifier, and in other implementations the registration message includes the group identifier and the obtaining comprises obtaining from a unified data management (UDM) entity the plurality of subscriber identifiers which identify the plurality of subscribers of the group based on the group identifier.

Even another illustrative example includes a technique which may involve maintaining a single session (e.g. a PDU session) between a base station and a UPF for IP data traffic of two or more subscribers of a group, with use of the techniques described herein. A related technique may involve establishing such a session between a base station and a UPF for IP data traffic of a first subscriber of a group, and including a second subscriber of the group (e.g. and one or more subsequent subscribers of the group) in the session between the base station and the UPF for IP data traffic of the second subscriber (e.g. and one or more subsequent subscribers of the group). Even another technique may involve maintaining a single session or signaling communication between network functions (NFs) (e.g. between AMF and SMF, between SMF and PCF, and/or between SMF and UPF) for two or more subscribers of a plurality of subscribers of a group, with use of the techniques herein. A related technique may involve establishing a session or communication signaling between NFs for managing IP data traffic of a first subscriber of a group, and including a second subscriber of the group (e.g. and one or more subsequent subscribers of the group) in the same session for communication signaling between the NFs for managing IP traffic of the second subscriber (e.g. and one or more subsequent subscribers of the group).

Another illustrative example of a technique may involve maintaining a single bearer between a base station and a gateway for IP data traffic of two or more subscribers of a plurality of subscribers of a group, with use of the techniques herein. A related technique may involve establishing a bearer between a base station and a gateway for IP data traffic of a first subscriber of a group, and including IP data traffic of a second subscriber of the group (e.g. and subsequent subscribers in the group) over the same bearer. The IP data traffic flow for the two or more subscribers may be established and maintained via a single tunnel (e.g. mapping the data packets for two or more subscribers over the same tunnel), with use of the techniques herein.

Yet even another illustrative example includes a technique which may involve maintaining a single session or signaling communication between network entities (e.g. between MME and S-GW, between S-GW and P-GW, and/or between P-GW and PCRF) for two or more subscribers of a plurality of subscribers of a group, with use of the techniques herein. A related technique may involve establishing a session or communication signaling between the network entities for managing IP data traffic of a first subscriber of a group, and including a second subscriber of the group (e.g. and subsequent subscribers in the group) in the same session or communication signaling between the network entities for managing IP data traffic of the second subscriber (e.g. and subsequent subscribers in the group).

Note that the components and techniques shown and described in relation to the separate figures may indeed be provided as separate components and techniques, and alternatively one or more (or all of) the components and techniques shown and described in relation to the separate figures are provided together for operation in a cooperative manner.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first subscriber or UE could be termed a second subscriber or UE, and similarly, a second subscriber or UE could be termed a first subscriber or UE, without changing the meaning of the description, so long as all occurrences of the "first subscriber or UE" are renamed consistently and all occurrences of the "second subscriber or UE" are renamed consistently. The first subscriber or UE and the second subscriber or UE are both subscribers or UEs, but they are not the same subscriber or UE.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
   at an access and mobility management function (AMF) for use in a mobile network,
      receiving a request for registration for a user equipment (UE) associated with a first-registering subscriber of a group of subscribers, the request including a group identifier which identifies the group of subscribers;
      sending a request for subscriber data which includes the group identifier, and receiving a response which includes a plurality of subscriber identifiers which identify the subscribers of the group;
   creating and storing, at the AMF, a context for a group session for the subscribers of the group;
      receiving, from a policy control function (PCF) instance, access policies associated with the group;
      including the access policies in the context for the group session; and
      sending, to the UE associated with the first-registering subscriber of the group, an acceptance to the request for registration, the acceptance including the access policies,
      wherein the context for the group session which includes the access policies is used for one or more subsequently-registering UEs associated with one or more remaining subscribers of the group.

2. The method of claim 1, further comprising:
   at the AMF,
      selecting the PCF instance; and
      including an identifier of the PCF instance in the context for the group session.

3. The method of claim 1, wherein the group identifier is included in a slice differentiator (SD) of network slice selection assistance information (NSSAI) for the UE associated with the first-registering subscriber of the group.

4. The method of claim 1, further comprising:
   at the AMF,
      receiving, from the UE associated with the first-registering subscriber of the group of subscribers, a session establishment request for establishing a protocol data unit (PDU) session:
      identifying a session management function (SMF) instance for managing the PDU session; and
      including an identifier of the SMF instance in the context for the group session,
      wherein the SMF instance is used for the one or more subsequently-registering UEs associated with the one or more remaining subscribers of the group.

5. The method of claim 1, wherein receiving the access policies associated with the group comprises:
   sending, to the PCF instance, a context establishment request which includes the group identifier; and
   receiving, from the PCF instance, a response to the context establishment request which includes the access policies associated with the group identifier.

6. The method of claim 1, further comprising:
   at the AMF,
      receiving, from the UE associated with the first-registering subscriber of the group, a session establishment request which includes the group identifier;
      sending, to a network repository function (NRF), a request for a session management function (SMF) instance;
      receiving, from the NRF, a response to the request for the SMF instance, the response including an identifier of the SMF instance; and
      including the identifier of the SMF instance in the context for the group session.

7. The method of claim 1, further comprising:
   at the AMF,
      receiving, from the UE associated with the first-registering subscriber of the group, a session establishment request for establishing a protocol data unit (PDU) session;
      identifying a session management function (SMF) instance for managing the PDU session;
      sending, to the SMF instance, a message which includes a session request;
      receiving, from the SMF instance, a message which includes a session acceptance indicating a plurality of IP addresses for the group of subscribers;
      including the plurality of IP addresses for the group of subscribers in the context for the group session;
      identifying one of the plurality of IP addresses for assignment to the UE associated with the first-registering subscriber of the group.

8. The method of claim 7, further comprising:
   at the AMF,
      receiving a subsequent request for registration for one of the one or more subsequently-registering UEs associated with one of the one or more remaining subscribers of the group; and
      identifying, from the context, another one of the plurality of IP addresses for assignment to the subsequently-registering UE.

9. The method of claim 1, further comprising:
   at the AMF,
      receiving a subsequent request for registration for one of the one or more subsequently-registering UEs associated with one of the one or more remaining subscribers of the group, and
      sending, to the subsequently-registering UE, the access policies identified from the context.

10. A method comprising:
    at an entity for mobility management,
       receiving a request for registration for a user equipment (UE) associated with a subscriber, the request including a subscriber identifier which identifies the subscriber;

sending a request for subscriber data which includes the subscriber identifier, and receiving a response which includes a plurality of subscriber identifiers which identify subscribers of a group identified by a group identifier;

creating and storing, at the entity for mobility management, a context for a group session for the group of subscribers;

obtaining and storing, in the context, policy data for the group session;

obtaining and storing, in the context, a plurality of IP addresses for the group of subscribers; and wherein the context which includes the policy data and the plurality of IP addresses is used for the UE associated with the subscriber of the group and for one or more subsequently-registering UEs associated with one or more remaining subscribers of the group.

11. The method of claim 10, further comprising:
at the entity for mobility management,
identifying one of the plurality of IP addresses for assignment to the UE associated with the subscriber of the group.

12. The method of claim 11, further comprising:
at the entity for mobility management,
receiving a subsequent request for registration for one of the one or more subsequently-registering UEs associated with one of the one or more remaining subscribers of the group; and
identifying, from the context, another one of the plurality of IP addresses for assignment to the subsequently-registering UE.

13. The method of claim 10,
wherein the plurality of IP addresses in the context are for assignment to the subscribers of the group.

14. The method of claim 10, wherein the entity for mobility management comprises one of a mobility management entity (MME) or an access and mobility management function (AMF).

15. The method of claim 10, further comprising:
wherein receiving the response comprises receiving from a home subscriber server (HSS) the plurality of subscriber identifiers which identify the subscribers of the group based on the subscriber identifier; or
wherein the request for registration further includes the group identifier, and wherein receiving the response comprises receiving from a unified data management (UDM) entity the plurality of subscriber identifiers which identify the subscribers of the group based on the group identifier.

16. The method of claim 10, further comprising:
at the entity for mobility management,
receiving a subsequent request for registration for one of the one or more subsequently-registering UEs associated with one of the one or more remaining subscribers of the group; and
using, for the subsequently-registering UE, the policy data from the context.

17. Network equipment for an access and mobility management function (AMF) comprising:
one or more processors;
memory coupled to the one or more processors;
a communication interface;
the one or more processors being configured to:
receive, via the communication interface, a request for registration for a user equipment (UE) associated with a subscriber of a group of subscribers, the request including a group identifier which identifies the group of subscribers;
send a request for subscriber data which includes the group identifier, and receive a response which includes a plurality of subscriber identifiers which identify the subscribers of the group;
create and store, at the AMF, a context for the subscribers of the group;
receive, from a policy control function (PCF) instance, access policies associated with the group;
include the access policies in the context for the group of subscribers; and
send, to the UE associated with the subscriber of the group, an acceptance to the request for registration, the acceptance including the access policies,
wherein in the context which includes the access policies is used for one or more subsequently-registering UEs associated with one or more remaining subscribers of the group.

18. The method network equipment for the AMF of claim 17, wherein the one or more processors are further configured to:
receive, from the UE associated with the subscriber of the group, a session establishment request for establishing a protocol data unit (PDU) session;
identify a session management function (SMF) instance for managing the PDU session;
send, to the SMF instance, a message which includes a session request;
receive, from the SMF instance, a message which includes a session acceptance indicating a plurality of IP addresses for the group of subscribers;
include the plurality of IP addresses in the context for the group of subscribers; and
identify one of the plurality of IP addresses for assignment to the UE associated with the subscriber of the group.

19. The method network equipment for the AMF of claim 18, wherein the one or more processors are further configured to:
receive a subsequent PDU session establishment request for one of the one or more subsequently-registering UEs associated with one of the one or more remaining subscribers of the group; and
identify, from the context, another one of the plurality of IP addresses for assignment to the subsequently-registering UE.

* * * * *

UNITED STATES PATENT AND TRADEMARK OFFICE
CERTIFICATE OF CORRECTION

PATENT NO. : 10,791,431 B2  
APPLICATION NO. : 15/823361  
DATED : September 29, 2020  
INVENTOR(S) : Konstantin Livanos et al.

Page 1 of 1

It is certified that error appears in the above-identified patent and that said Letters Patent is hereby corrected as shown below:

In the Claims

Claim 4, Column 25, Line 65, please replace "(PDU) session:" with --(PDU) session;--

Claim 7, Column 26, Line 40, please replace "group session;" with --group session; and--

Claim 18, Column 28, Line 29, please replace "The method network equipment" with --The network equipment--

Claim 19, Column 28, Line 46, please replace "The method network equipment" with --The network equipment--

Signed and Sealed this  
Sixteenth Day of November, 2021

Drew Hirshfeld  
*Performing the Functions and Duties of the*  
*Under Secretary of Commerce for Intellectual Property and*  
*Director of the United States Patent and Trademark Office*